United States Patent
Wiersdorff et al.

(10) Patent No.: US 9,588,012 B2
(45) Date of Patent: Mar. 7, 2017

(54) METHOD FOR CALCULATING THE SURFACE AREA OF OPTICAL LENSES AND PROJECTION LENSES MANUFACTURED ACCORDING TO THE METHOD FOR USE IN A LIGHT MODULE IN A MOTOR VEHICLE HEADLAMP

(71) Applicant: Automotive Lighting Reutlingen GmbH, Reutlingen (DE)

(72) Inventors: Steffen Wiersdorff, Metzingen (DE); Hermann Kellermann, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 270 days.

(21) Appl. No.: 14/457,231

(22) Filed: Aug. 12, 2014

(65) Prior Publication Data
US 2015/0043240 A1 Feb. 12, 2015

(30) Foreign Application Priority Data
Aug. 12, 2013 (DE) .......................... 10 2013 215 897

(51) Int. Cl.
*G01M 11/02* (2006.01)
*F21S 8/10* (2006.01)
(Continued)

(52) U.S. Cl.
CPC ........... *G01M 11/02* (2013.01); *F21S 48/125* (2013.01); *G02B 19/0004* (2013.01);
(Continued)

(58) Field of Classification Search
None
See application file for complete search history.

(56) References Cited

U.S. PATENT DOCUMENTS

| 7,648,262 B2 | 1/2010 | Tanaka |
| 2005/0086032 A1 | 4/2005 | Benitez et al. |

(Continued)

FOREIGN PATENT DOCUMENTS

DE  10 2008 030 597 A1  1/2009

OTHER PUBLICATIONS

Jan. 13, 2015 European Search Report for European Application No. 14177266.5-1553.
(Continued)

*Primary Examiner* — Britt D Hanley
(74) *Attorney, Agent, or Firm* — Howard & Howard Attorneys PLLC

(57) ABSTRACT

A method for calculating the surfaces of optical lenses including the steps of: providing a desired light distribution to be generated with light passing through the lens; deforming a first surface of the lens to generate light source images of different sizes; deforming a second surface of the lens to displace the light source images such that they lie at their highest point directly at or on a light/dark border in a resulting light distribution; determining a quality of the resulting light distribution by a comparison with the predefined light distribution; if the quality lies above a predefined limit value, storing the calculated surfaces for the lens; otherwise, renewed deformation of the first surface; renewed deformation of the second surface; repeating the previous two steps until the quality of the resulting light distribution lies above the limit value; and storing the calculated surfaces for the lens.

12 Claims, 19 Drawing Sheets

(51) Int. Cl.
*G02B 19/00* (2006.01)
*G02B 27/00* (2006.01)

(52) U.S. Cl.
CPC ..... *G02B 19/0028* (2013.01); *G02B 19/0033* (2013.01); *G02B 27/0012* (2013.01)

(56) References Cited

U.S. PATENT DOCUMENTS

2007/0291499 A1 12/2007 Tanaka
2008/0316761 A1 12/2008 Minano et al.

OTHER PUBLICATIONS

Mar. 21, 2014 Examination Report for German Application No. 10 2013 215 897.1.

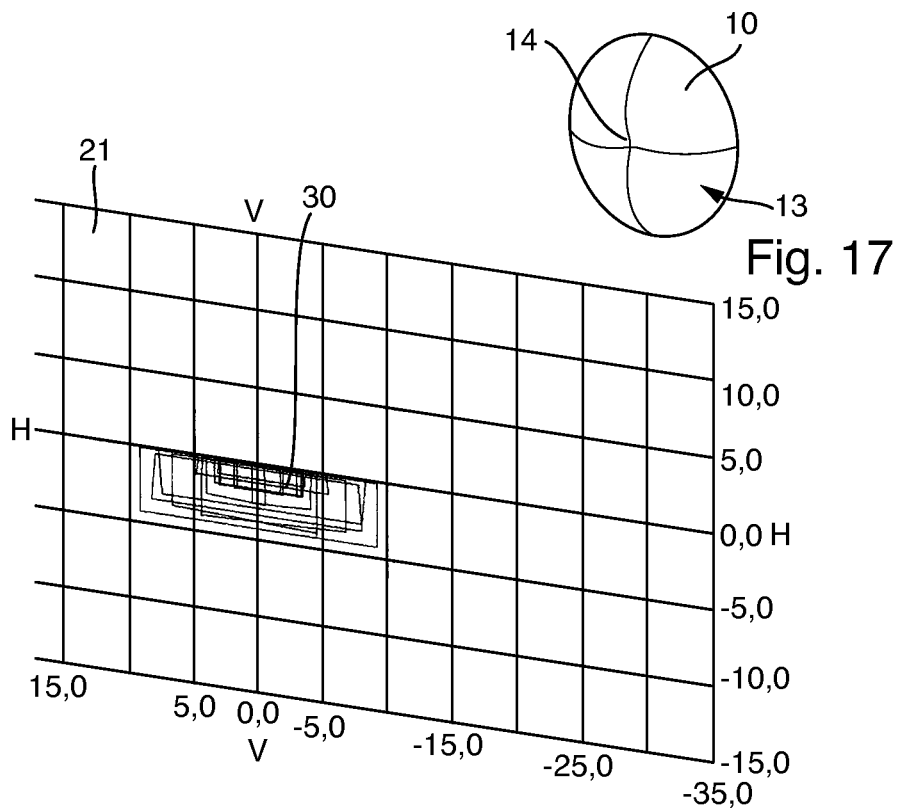
Fig. 17
Fig. 18
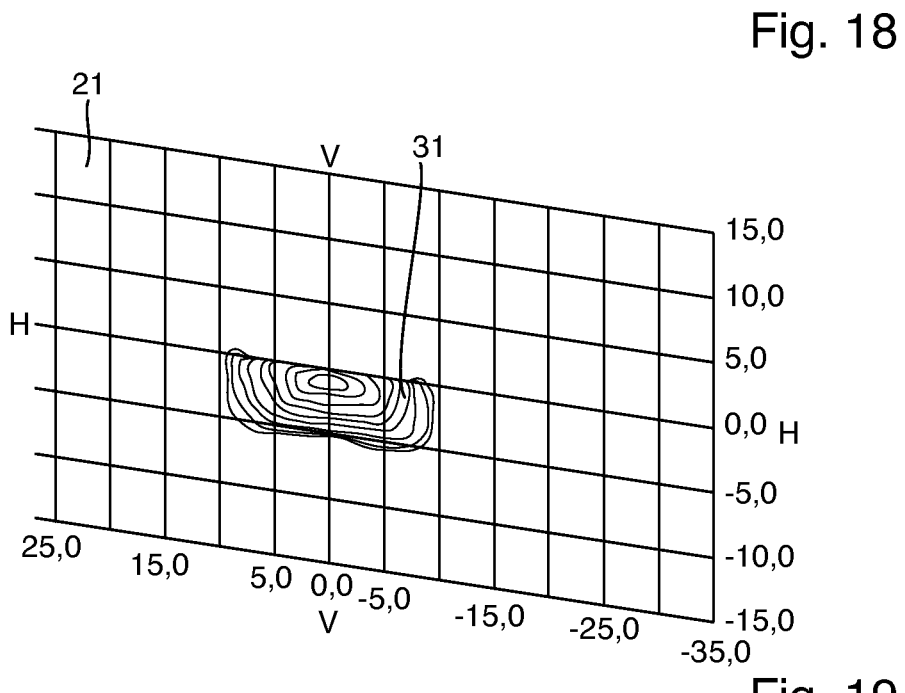
Fig. 19

METHOD FOR CALCULATING THE SURFACE AREA OF OPTICAL LENSES AND PROJECTION LENSES MANUFACTURED ACCORDING TO THE METHOD FOR USE IN A LIGHT MODULE IN A MOTOR VEHICLE HEADLAMP

CROSS-REFERENCE TO RELATED APPLICATION

This application is based upon and claims priority to German Patent Application No. DE 102013215897.1 filed on Aug. 12, 2013.

BACKGROUND OF THE INVENTION

1. Field of the Invention

The present invention relates, generally, to light modules for motor vehicle headlamps and, more specifically, to a method for calculating the surface area of optical lenses and projection lenses manufactured according to the method for use in a light module in a motor vehicle headlamp.

2. Description of the Related Art

Projection lenses known in the art used with light modules in motor vehicle headlamps are typically designed to project at least a portion of light emitted from a light source in the light module onto a road surface in front of the motor vehicle so as to generate a low beam light distribution.

In the field of motor vehicle lighting devices, in particular in the field of motor vehicle headlamps, one can, in principle, differentiate between two different types of light modules. With so-called reflection modules, the desired light distribution on the road surface in front of the motor vehicle is generated with a reflector, which reflects the light emitted by the light source onto the road surface in order to generate the desired low beam light distribution. With projection modules, an additional projection lens is disposed in the beam path and projects the light bundled by the reflector or other type of primary lens, for generating the desired low beam light distribution onto the road surface in front of the motor vehicle. In order to generate the low beam light distribution, typically an aperture assembly is disposed between the primary lens and the projection lens, wherein an upper edge of the aperture assembly is designed to generate a light/dark border in the low beam light distribution from the projection lens onto the road surface in front of the motor vehicle.

Reflection modules have different sized light source images in the resulting light distribution, due to different spacings and perspectives of light sources and reflector ranges. These differently sized light source images can be used well in the configuration of a reflection module of this type for making use of the light source images in order to illuminate different regions in the resulting light distribution. As such, the use, for example, of small light source images for creating the light/dark border in the low beam light distribution and to obtain the largest possible range for the light distribution is known in the art, in that the small light source images are reflected to a position in the light distribution that is as close as possible to the bottom of the light/dark border. Large light source images, conversely, are frequently used to illuminate the foreground or close-range in front of the vehicle, as well for illuminating the lateral regions in the resulting light distribution. In particular, the desire to direct light into the distance, directly beneath the light/dark border, so as to obtain a greatest possible range for the resulting light distribution, is only possible with the smallest possible light source images.

With projection modules, reflectors or other types of primary lenses are used for bundling the light emitted from a light source. As such, the use of lens systems or so-called adapter lenses, for example, is known in the art. Adapter lenses are normally manufactured from transparent glass or plastic material, in which the light emitted from the light source is coupled. The coupled light is, at least in part, subjected to a total internal reflection at the outer border surfaces, and then exits the adapter lens. The portion of the coupled light not subjected to a total internal reflection preferably exits the adapter lens directly. The bundling of the light occurs thereby through refraction at the light entry and/or light exit surface, and through the total internal reflection at the border surfaces of the adapter lens.

Further, secondary lenses are used with projection modules, in order to image the bundled light onto the road surface, and to generate the desired low beam light distribution. The secondary lenses can be designed as reflectors or as projection lenses. The projection lenses can image the light distribution, generated with the bundled light in an intermediate plane, into the distance, or can be designed as a so-called direct imaging system.

With direct imaging projection modules, a light source, which may include one or more light emitting diodes (LEDs), for example, is imaged onto the road surface via the projection lens, without the need for further optically active surfaces for bundling or deflecting the light beams. Direct imaging projection modules of this type generate light distributions with a suitable shape of the projection lens, which exhibits a defined expansion in both the horizontal and vertical direction.

In addition, projection lenses known in the art may be designed so as to generate a low beam light distribution having a substantially horizontal light/dark border without an additional aperture assembly disposed in the beam path. In this way, the light/dark border can fulfill the ECE, SAE, or any other government-mandated requirements.

The projection lenses known in the art for use in light modules for a motor vehicle headlamp are shaped such that one side of the lens is either planar, convex, or concave. In this case, the divergence of the light beams exiting a known projection lens is nearly uniform over the entire light exit surface of the projection lens. The images of the light source with a projection lens of this type all have a similar size on a measurement screen disposed at a spacing to the light module, or to the motor vehicle headlamp, respectively. As a result, the projection modules differ significantly from the reflection modules.

As a result, with the nearly same sized light source images generated by a projection module, it is not possible, in generating the resulting light distribution from a projection module of this type, to deflect differently sized light source images in different regions of the resulting light distribution. In particular, there are no particularly small images that can be used to generate a large range for the light distribution, and there are no particularly large light source images that can be used to illuminate the foreground or lateral illumination areas in the region of the light distribution. In order for the resulting light distribution of the projection module to therefore fulfill the demanded customer requirements, it is known from the prior art to deflect the basically same sized light source images into the desired regions of the light distribution, without affecting their sizes. In particular with the known projection modules, a satisfactory foreground illumination is only possible by lowering the relatively small light source images. This means that light source images from one region need to be pushed downward, to directly beneath the light/dark border in the foreground of the light distribution. This results in a weakening of the range and the gradient at the light/dark border.

It would be theoretically possible to modify the imaging scale via the spacing between the light source and the projection lens. In order to obtain small light source images, the spacing would then need to be increased. This, however, would necessitate enlarging the projection lens transverse to the beam direction, in order to accommodate the same spatial angle with respect to the light source. Alternatively, with the same dimensions transverse to the angle of radiation, less light passes through the projection lens, weakening the efficiency of the projection module.

Thus, there remains a need in the art for a method for calculating the surfaces of optical lenses, a projection lens, a projection module, and/or a motor vehicle headlamp in this respect, such that imaging systems with different imaging scales can be generated, wherein different sized light source images are available which can then be deflected in a targeted manner into the desired regions of the resulting light distribution. In particular, it is desirable to have smaller light source images available for illuminating the region of the light distribution directly beneath the light/dark border, and larger light source images available for illuminating a region of the light distribution in the foreground and/or the lateral regions of the light distribution, with a direct imaging projection module.

SUMMARY OF THE INVENTION

The present invention overcomes the disadvantages in the prior art in a method of calculating the surfaces of optical lenses. The method includes the steps of: a) provision of a desired light distribution, which is generated by the light passing through the calculated lens; b) deformation of a first surface of the lens, with the aim of generating different sized light source images in the light distribution; c) deformation of a second surface of the lens lying opposite the first surface, with the aim of displacing all of the light source images such that they lie at their respective uppermost point directly at or on a light/dark border of a resulting light distribution, which is obtained with the lens having the deformed surfaces; d) determination of a quality of the resulting light distribution through comparison with the predefined light distribution; e) if the quality lies above a predefined limit value, storing the calculated surfaces for the lens and ending the method; f) otherwise, renewed deformation of the first surface, with the aim of generating a greater or lesser bundling of the light source images in the light distribution; g) renewed deformation of the second surface, with the aim of displacing all of the light source images such that they lie at their respective highest points at or on the light/dark border of the resulting light distribution; h) repetition of the steps f) and g) until the quality of the resulting light distribution lies above the limit value; and i) storing the calculated surfaces for the lens, and ending the method.

The desired light distribution can be defined in step a) by government-mandated regulations (for example, ECE, SAE or other regulations), or by the desires of a client (for example, a headlamp manufacturer or a motor vehicle manufacturer). As such, it may, for example, be the desire of a client to obtain a low beam light distribution corresponding to government-mandated regulations, having a particularly sharp light/dark border and/or a foreground illumination that starts particularly close to the vehicle, and/or one or more lateral regions that are particularly brightly illuminated. This can be attained with a light module, or headlamp, respectively, of the invention, having a projection lens, the surfaces of which are calculated in accordance with the method of the invention.

Step b) is simulated on a computer using a mathematical model for calculating the lens. In one embodiment, discrete points on the lens surface are calculated, or varied, thereby, such that the light beams passing through the deformed regions of the lens generate larger or smaller light source images, respectively. The sizes of the light source images can likewise be simulated using a mathematical model for the beam path of the deformed lens. The deformation of the first lens surface is the prerequisite for being able to provide a good illumination in the foreground and/or lateral regions of the light distribution in the resulting light distribution, while, at the same time, however, there still being sufficient light available for generating a sharp light/dark border. This is obtained in that—unlike in the prior art until now—the light source images are not simply lowered into the foreground, or moved to the side in the lateral regions, respectively. In this case, the light moved into the foreground or into the lateral regions would not be available for generating the light/dark border. Instead, a first lens surface is deformed with the invention in such a manner that different sized light source images are generated.

In step c), the other lens surface is then deformed, such that all light source images each lie at their highest point at or on the light/dark border. This too is calculated in the framework of a simulation using a mathematical model for the deformed lens. The light source images are thus directed as closely as possible to the light/dark border. The large light source images extend in their lower regions into foreground. The lower portion of the large light source images can thus be used to illuminate the foreground. At the same time, however, the upper regions of the large images are disposed at or on the light/dark border, such that no light is lost there, as is the case with the prior art, as a result of the lowering of all of the light source images into the foreground. For this, the type and scope of the deformation of the lens surfaces can be defined by external ancillary conditions. These ancillary conditions can be, for example, structural specifications (for example, space restrictions) for the light module or the headlamp. As such, a deformation of the lens surfaces in the lower region of the lens with light modules disposed deeply in the headlamp can be undertaken in such a manner that in this region, small light source images are generated. As a result of the light bundles diverging to a lesser extent, less light strikes a masking frame, for example, such that more light is available for generating the resulting light distribution, and at the same time, disruptive reflections are reduced. One approach for deforming the surfaces in the upper and lower regions of the lens enables the generation of a light distribution that until now could only be implemented with reflection systems. For this, preferably regions from which the initially large light source images are obtained are deformed such that the light source images are further enlarged. An analogous approach can be used to generate even smaller light source images from initially small images.

In step d), the quality of the resulting light distribution can be determined in an arbitrary manner with a comparison with the light distribution previously defined in step a). As such, one could check, for example, whether the maximum for the intensity distribution lies at a predefined point in the light distribution, in particular, sufficiently close to the light/dark border. Likewise, it is also possible to check whether the intensity values for the resulting light distribution in the foreground and/or lateral regions of the light distribution fulfill the requirements for the predefined light distribution. Moreover, it is conceivable to check whether the intensity values above the light/dark border do not exceed a legal, predefined maximum. The evaluation of the resulting light distribution can thus occur based on numerous different criteria. The determination of the quality of the light distribution can be carried out manually, or in an automated manner. If the quality of the resulting light distribution does not satisfy the predefined demands (compare step f)), then the surfaces of the lens to be calculated are further deformed (compare steps g) and h)) in an iterative procedure, such that, on one hand, different sized light source images are generated, and the light source images all lie at their uppermost points at or on the light/dark border, and such that, on the other hand, however, the resulting light distribution formed by the overlapping of the individual light source images corresponds as much as possible to the predefined light distribution. In order to determine the quality of the resulting light distribution, it is also possible to simply count the number of iterations that have been executed. In one embodiment of the invention, the iterative procedure can be stopped after a predefined number of iterations. As such, it is conceivable, for example, with an intensity maximum of the resulting light distribution that does not lie close enough to the light/dark border, to generate even smaller light source images, in that the divergence of the light bundles for small light source images is reduced even further. A maximum for the smaller images can then be directed even closer to the light/dark border, such that the maximum for the resulting light distribution on the whole moves closer to the light/dark border. Whether the obtained deformation of the lens surfaces during the iterative procedure of the steps g) and h) results in the desired effect is then checked by checking the quality of the resulting light distribution in step h).

As soon as a stop criterion is fulfilled, specifically when the quality of the resulting light distribution meets a predefinable limit value, such as when the resulting light distribution corresponds to the predefined light distribution to the desired extent, the values calculated for the surfaces of the lens are stored. The reaching of a predefined number of iterations can also be defined as a stop criterion. The stored values can be used for the production of a lens corresponding to the values, or for simulation purposes, for example, for the simulation of the beam course of a light module equipped with the lens, or they can be used as CAD data, for example, in designing a light module or headlamp equipped with the lens.

It is proposed that the first surface is a light exit surface, and the second surface is a light entry surface. As a matter of course, the method can also be executed if first the light entry surface, for varying the size of the light source images, is deformed, and subsequently the light exit surface, for positioning the highest point on the light source image at or on the light/dark border, is deformed.

The imaging properties of a projection lens that has been calculated in this manner is are selected such that, in order to generate the low beam light distribution, small light source images lie directly beneath a light/dark border of the light distribution, and large light source images extend into the foreground and/or lateral regions of the light distribution.

Using the projection lens of the invention, imaging systems can be generated having different imaging scales. For this, instead of a typical imaging projection lens, a projection lens is used that sharply focuses only a small region of the intermediate light distribution generated by a primary lens, and the intermediate light distributions from other regions remain diffused, due to a differently modifying, location specific imaging scale, viewed over the vertical section surface of the projection lens. This results in it being possible to generate light source images of different sizes with the projection lens of the invention. In order to generate a maximum and/or a local gradient in the region of the light/dark border of a low beam light distribution, small light source images are used in the light distribution. These can concentrate local light in a very precise manner. In order to generate uniform light distributions, particularly in the foreground region or lateral regions of a light distribution, larger light source images are used. The present invention enables projection systems and motor vehicle headlamps to be designed such that the can generate both small and large light source images using a single projection lens.

A projection lens of this type can be calculated using a novel computer program. This program calculates, in a manner similar to that already known for calculating so-called free-form reflectors, a projection module for given structural conditions, having the form of a projection lens, in order that a desired light distribution having a desired number and position of relatively small and large light source images can be generated.

The structural conditions for a projection module are, for example, the spacing between a light source and the projection lens, a diameter of the projection lens, a focal length of the projection lens, a configuration of the projection lens with respect to a focal point of the projection lens, the type, design and/or orientation of the light source. These and other conditions can be defined as boundary parameters, and are taken into account by the computer program for the further calculation. The computer program is based on a predefined shape for a projection lens having a predefined surface contour for the light entry surface and the light exit surface. The computer program then determines discrete point values in accordance with the iterative procedure of the invention, which are those points at which the predefined lens needs to be deformed in order that the resulting light distribution is as close as possible to the predefined light distribution. Lastly, an interpolation can be made between the calculated discrete points of the lens surfaces, such that one obtains a close approximation of the form, or surface contour, respectively, for the light entry surface and/or the light exit surface, for a projection lens that is suited for generating the desired light distribution.

The calculation of the shape of the projection lens, or the contour of the lens surfaces, respectively, may include separate calculations for the desired light distribution in the vertical direction and for the desired light distribution in the horizontal direction, and can occur, in particular, successively. The surface contour for the projection lenses can be varied at the discrete points until the desired light distribution has been obtained to the greatest possible extent. The computer program executes an iterative procedure thereby, which is stopped when the actually obtained light distribution at a specific number of discrete points is as close as possible to the desired light distribution. If the stopping criterion is fulfilled, the method implemented with the computer program is stopped. The data calculated for the shape and/or the surface contour for the projection lens suited to generating a desired light distribution can be used directly for producing the lens, in that they are applied to a milling tool, for example, in order to mill the desired projection lens from a glass block.

In one embodiment of the method the invention, the quality of the light distribution may be determined with an optimization program. The optimization program advantageously uses a target function to describe the resulting light distribution that is to be obtained by the lens with the deformed surface, wherein it is attempted to minimize the target function with the deformation of the surfaces. Advantageously, the sum of least squares is used as the target function. In order to minimize the least squares, preferably the method of least squares is used.

In order to be able to determine the quality of the resulting light distribution in the framework of the automatically executed method, various approaches are conceivable. As one possible approach it is proposed that intensity values for the predefined light distribution, which is obtained with the lens having the deformed surfaces, are compared with one another in identical pixel grids for selected pixels, and the sums of least squares are calculated, in each case, from the square of the difference of the intensity values in a specific pixel. For selected pixels of the pixel grid, the intensity values are thus determined for the resulting light distribution and for the predefined light distribution, respectively. A difference of the intensity values in these pixels is calculated, and the square of the difference is formed. Based on the sum of the calculated squares for the selected pixels, the quality of the resulting light distribution can be determined automatically. In doing so, it is conceivable to weight the squares for different pixels differently.

BRIEF DESCRIPTION OF THE DRAWINGS

Other objects, features, and advantages of the present invention will be readily appreciated as the same becomes better understood after reading the subsequent description taken in connection with the accompanying drawing wherein:

FIG. 17 shows a perspective view of a projection lens according to a seventh embodiment of the invention, which results in a distortion of a light source in both a vertical direction as well as a horizontal direction.

FIG. 18 shows light source images generated in an exemplary manner with the lens of FIG. 17, distorted in both the vertical as well as horizontal direction.

FIG. 19 shows a light distribution obtained with the lens of FIG. 17 by superimposing the light source images of FIG. 18.

DETAILED DESCRIPTION OF THE INVENTION

Figure 27:
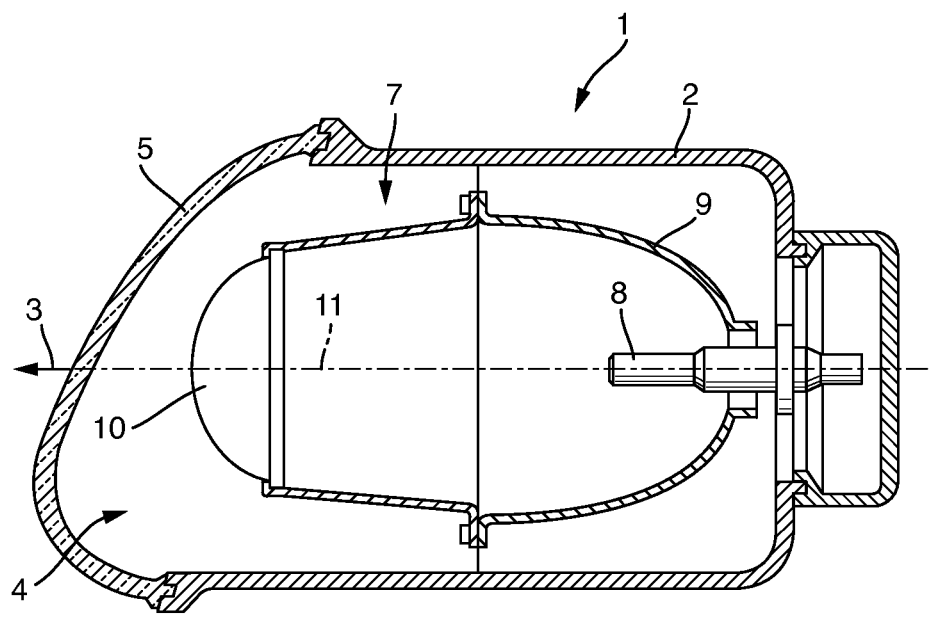
FIG. 27 shows a motor vehicle headlamp according to the invention in accordance with one embodiment.

A motor vehicle headlamp according to one embodiment of the invention is shown in FIG. 27. The headlamp is indicated as a whole by the reference numeral 1. The headlamp 1 includes a housing 2, preferably made of plastic. In a front section, when viewed in the light emission direction 3, the housing 2 has a light exit aperture 4, which is closed by a transparent cover plate 5. The cover plate 5 can have optically effective elements (for example, prisms or cylindrical lenses) for diffusing the light beams passing through it, preferably in a horizontal direction (so-called diffusion disks). Preferably the cover plate 5, however, is designed without optically effective elements (so-called clear disks). The cover plate 5 is made of a transparent glass or plastic material.

A light module is disposed in the interior of the headlamp housing 2, indicated as a whole by the reference numeral 7. The light module 7 includes a light source 8, which can be designed as an incandescent lamp, a gas discharge lamp, or one or more light emitting diodes (LEDs). The light beams emitted from the light source 8 are bundled with a primary lens 9, and basically deflected into the light emission direction 3. The primary lens 9 is designed as a reflector in the depicted embodiment example. It is, however, conceivable that the primary lens 9 is designed as a TIR (total internal reflection) adapter lens. An adapter lens of this type consists of a transparent glass or plastic material. The light emitted from the light source 8 is coupled in the adapter lens, subjected to total internal reflection at the outer boundary surfaces of the adapter lens, and then passes out of the adapter lens. The bundling of the light beams is obtained with a TIR adapter lens with a refraction when entering the adapter lens, or when exiting the adapter lens, and/or with a total internal reflection at the boundary surfaces.

Furthermore, a projection lens 10 is disposed in the beam path of the bundled light beams, which projects the light passing through it for generating a desired light distribution on a road surface in front of a motor vehicle equipped with the headlamp 1. The projection lens 10 is designed as a projection lens according to the invention, and will be explained in greater detail below. The light module 7 is also referred to as a projection module. It is disposed in the housing 2 such that it is stationary, or can be rotated about a horizontal and/or vertical axis. An optical axis for the projection module 7 is indicated by the reference numeral 11.

Lenses 10 are placed in the projection modules 7, which either reproduce a light distribution, which is generated with the reflector 9, for example, in an intermediate plane in the distance, or form so-called direct imaging systems, with which the light source 8 (typically an LED) are imaged via the lens 10, without the need for an additional optically active surface for bundling the light beams.

Direct imaging projection systems of this type generate light distributions with a suitable shape of the lens 10, which exhibits a defined expansion in both the horizontal direction as well as the vertical direction. The projection lens 10 is designed such that it can generate—in interacting with the primary lens 9—a light/dark border for a low beam light distribution, without an additional aperture assembly disposed in the beam path.

The light/dark border can run strictly along the horizontal in a symmetrical manner thereby, or it can be asymmetrical, for example, in accordance with ECE or SAE regulations. Known projection lenses are shaped such that one side of the lens is either planar, convex or concave in shape.

Figure 21:
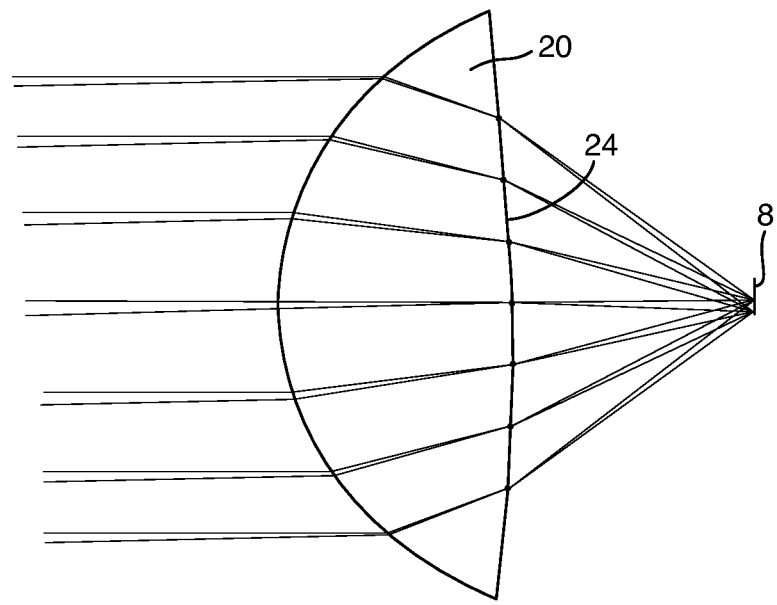
FIG. 21 shows a vertical cut through a known projection lens.
Figure 22:
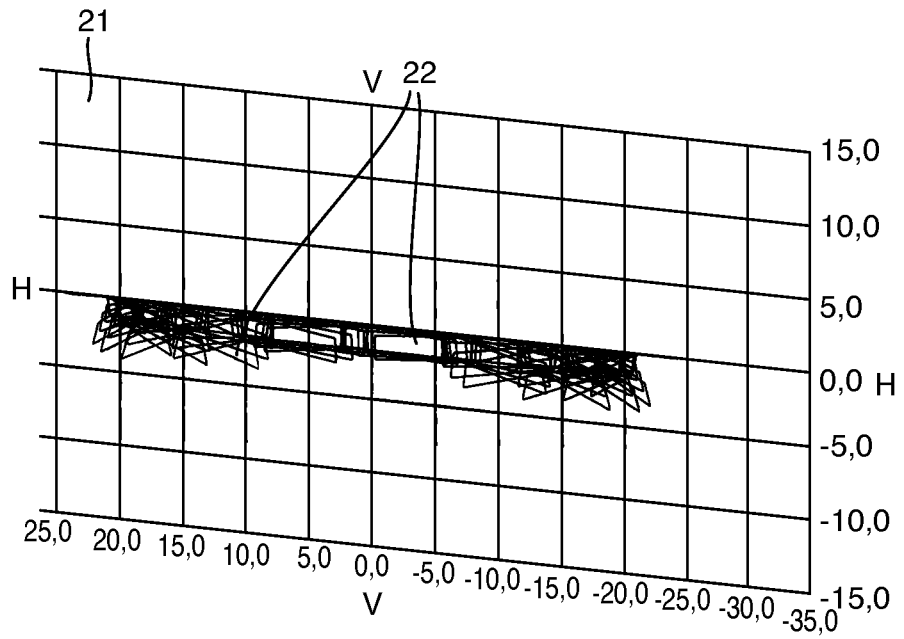
FIG. 22 shows conventional light source images generated with the known lens of FIG. 21.
Figure 23:
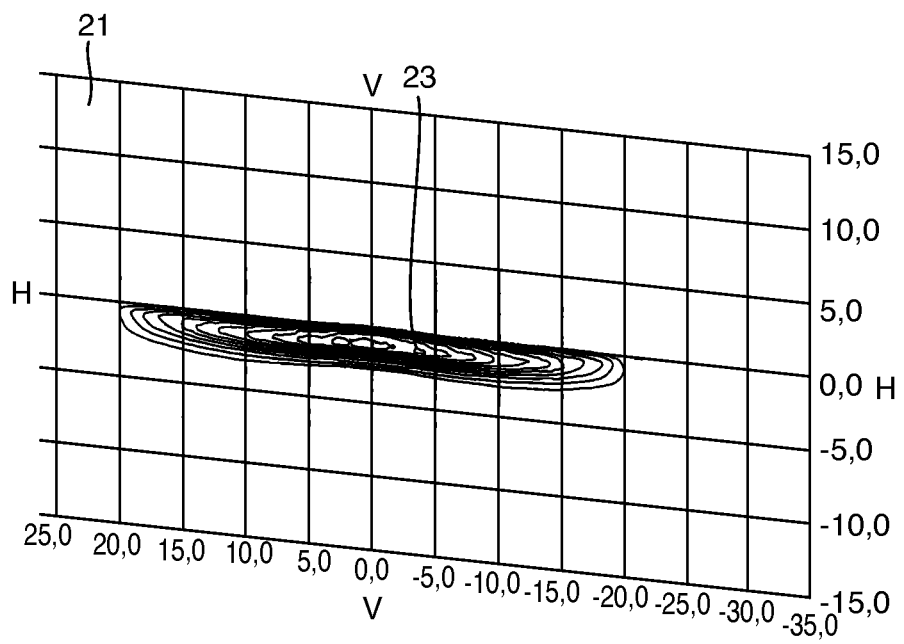
FIG. 23 shows a conventional light distribution obtained with the known lens of FIG. 21 by superimposing the light source images of FIG. 22.

FIG. 21 shows a vertical cut through a conventional projection lens 20 known from the prior art, with the corresponding beam path for exemplary selected light beams. The vertical expansions, or divergences, of the light beams leaving the lens 20 are nearly the same size, independently of the exit point from the lens 20. The light source images resulting therefrom, on a measurement screen 21 disposed at a spacing to a headlamp 1 equipped with the conventional projection lens 20, are depicted by way of example in FIG. 22. Two orthogonal axes are drawn on the measurement screen 21, a horizontal axis HH and a vertical axis VV. The axes HH, VV intersect at point HV. The optical axis 11 for the module 7 preferably runs through the point of intersection HV. The light source images 22, which can be generated with the conventional projection lens 20, differ slightly in shape, but their sizes are nearly identical. The light distribution 23 resulting on a measurement screen 21, with a superimposing of the light source images 22, is depicted in FIG. 23.

With respect to the beam paths of a known lens 20 of this type, the images 22 of the light source 8 all have a similar size on the measurement screen 21. As a result, when generating a desired light distribution with the conventional projection module, there is no possibility for generating particularly small images 22 for the distance range, or relatively large images for the foreground illumination and lateral illumination.

Because the known projection lens 20 cannot generate small light source images 22, it is only possible to obtain a foreground illumination by lowering the light source images 22. This means that images 22 are displaced downward, from the light/dark border into the foreground. As a result, the distance range is reduced, and the gradient at the light/dark border is weakened.

Figure 1:
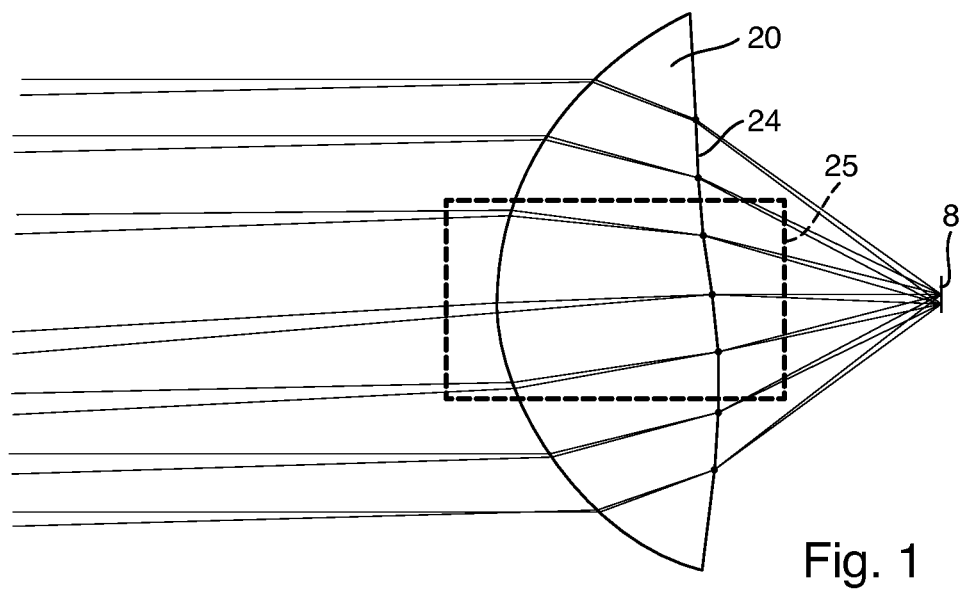
FIG. 1 shows a vertical cut through a projection lens known from the prior art for generating lowered light source images for a foreground illumination and/or lateral illumination in a light distribution.
Figure 2:
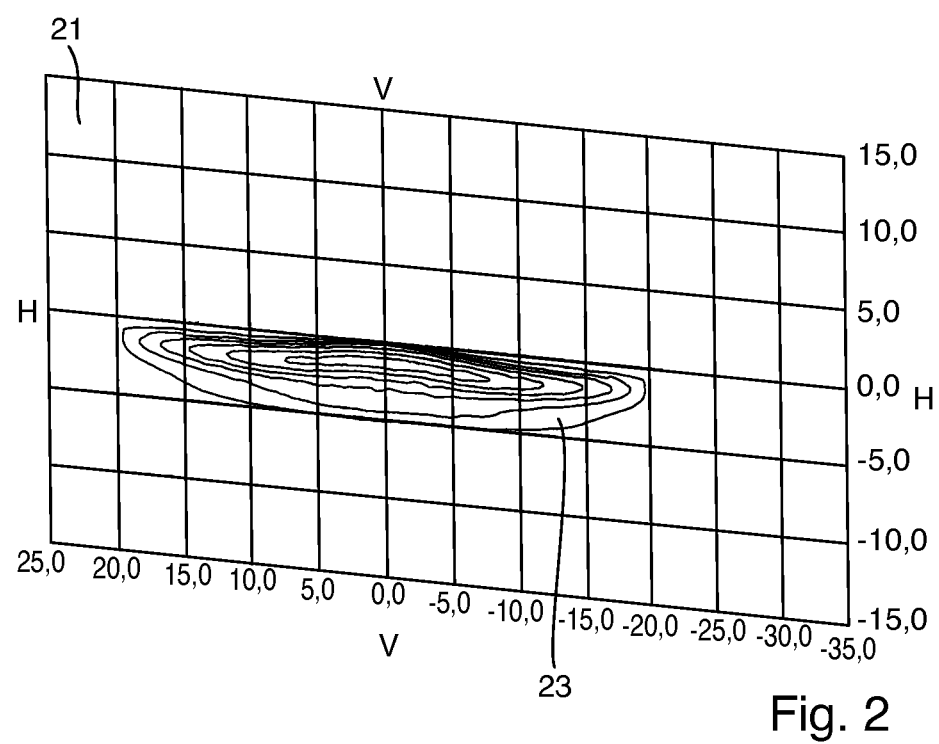
FIG. 2 shows a light distribution obtained with the lens of FIG. 1.

A projection lens 20 known from the prior art is depicted in FIG. 1, the light exit surface 24 of which has been slightly modified, in a region 25, in comparison with the conventional lens 20 of FIG. 21, in order to obtain the known effect of a lowering of the light source images 22 in order to illuminate the foreground. The lowered light beams are indicated by an arrow. The light distribution 23 for a projection lens 20 designed in this manner is shown in FIG. 2. The gradient at the light/dark border is weakened (the iso-lux lines at the upper side of the light distribution are not as densely packed together), and the light distribution 23 is lacking in terms of its distance range.

The present invention serves, in particular, for generating imaging systems, such as the projection module 7, for example, having various imaging scales. Instead of an imaging lens 20 known from the prior art, a projection lens 10 according to the invention is used, which only images a small region in sharp focus, and images other regions in a diffused manner, due to imaging scales of different sizes. As a result, light source images of different sizes are available for generating a desired, predefined light distribution. In order to generate a maximum and a local gradient in the region of the light/dark border of the light distribution, small light source images are used substantially. These can concentrate light locally in a very precise manner. In order to generate uniformly illuminated regions in the light distribution, in particular in the foreground, or to the sides of the light distribution, relatively large light source images are used. With the present invention, it is then possible to design projection lenses such that small and large light source images can be generated with a single projection lens 10. The present invention is based, in particular, on the consideration that a combination of light entry surfaces and light exit surfaces are present in a refractive body, which result in the light source images 22 appearing in different sizes on the measurement screen 21. With the conventional design for a projection lens 20, as depicted in FIG. 21, the light beams are propagated after exiting the lens with a divergence of nearly the same size.

Figure 3:
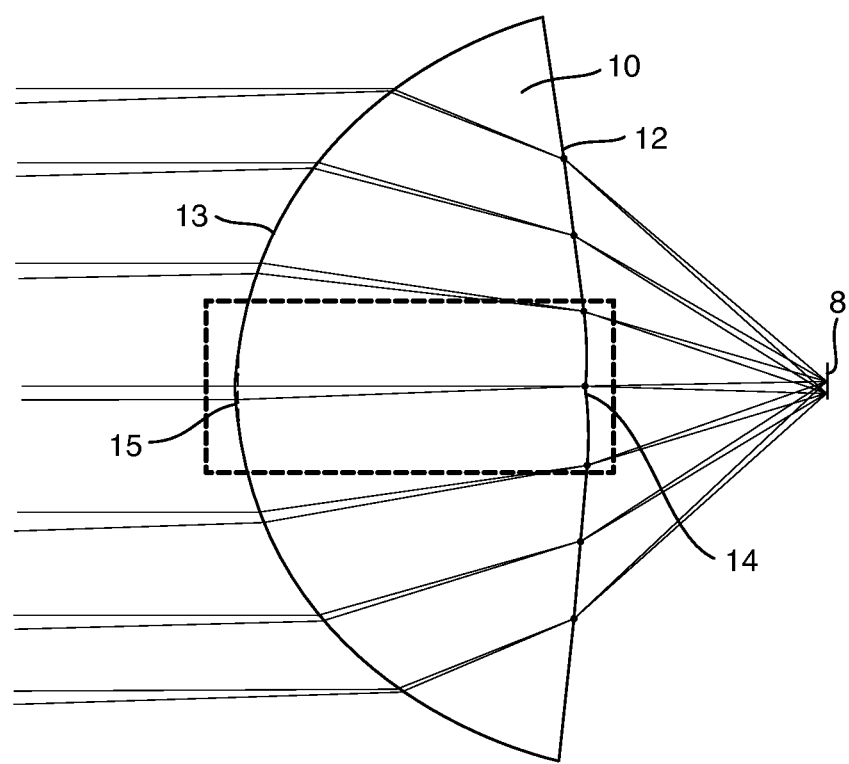
FIG. 3 shows a vertical cut through a projection lens according to a first embodiment of the invention for generating small light source images for a maximum and a light/dark border in a low beam light distribution.

A projection lens 10 according to a one embodiment of the present invention is depicted in FIG. 3. The depicted projection lens 10 is distinguished, in particular, in that it has, in the middle, meaning in the region of the optical axis 11 of the projection module 7, a light entry surface 12 having a special design, and a light exit surface 13 having a corresponding design. In particular, the projection lens 10 is designed at the middle such that the light beams in the region of the optical axis 11 exit the lens 10 in nearly parallel beams. This results in comparably small light source images, which are particularly well suited for generating light concentrations for maximums and light/dark borders in the light distribution. This is achieved in the depicted embodiment example in that a local recess 14 is formed in the middle of the light entry surface 12, and a local thickening 15 is formed in the middle of the light exit surface 13.

Figure 4:
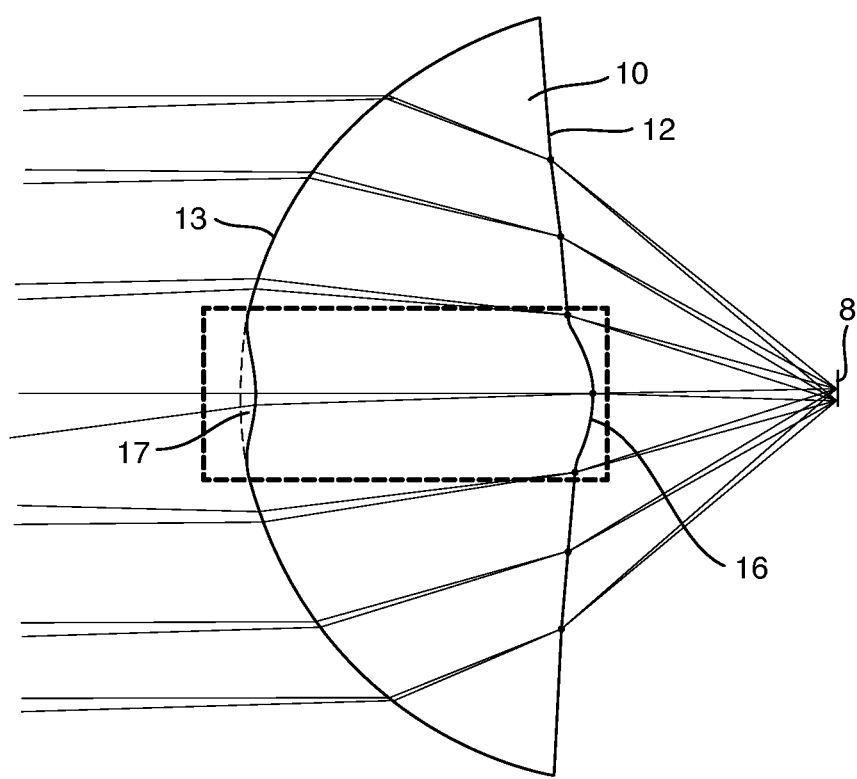
FIG. 4 shows a vertical cut through a projection lens according to a second embodiment of the invention for generating large light source images for a foreground illumination and/or lateral illumination in a light distribution.

Another embodiment of a projection lens 10 according to the invention is depicted in FIG. 4. The light entry surface 12 and the light exit surface 13 are designed thereby in a middle region of the lens 10, meaning they are in the region of the optical axis 11, such that the light beams in the middle exit the lens 10 strongly diverging. This leads to comparatively large light source images, which are particularly well suited for generating homogenous regions of the light distribution that are illuminated on a large scale for a foreground and/or lateral illumination. This is attained in the depicted embodiment example through a local thickening 16 of the light entry surface 12 and a corresponding local recess 17 in the light exit surface 13 in the middle of the projection lens 10.

Despite the different designs of the lenses 10, 20 of FIGS. 21, 3 and 4, all three lenses generate a sharply focused horizontal light/dark border. Each of the beam bundles can be aligned such that the highest point of a light source image lies on, or very close to, the light/dark border. The projection lens 10 in the light module 7 according to the invention, however, has the advantage that different sized light source images 31 can be generated with it, which can be deflected for an optimization of the light distribution in the desired regions of the light distribution (small images close to the light/dark border, large images in the foreground or lateral regions of the light distribution).

Figure 5:
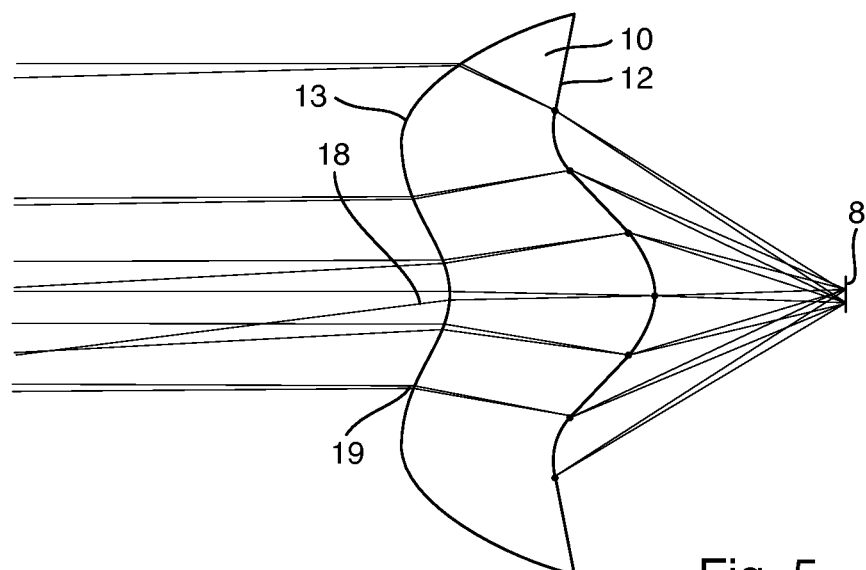
FIG. 5 shows a vertical cut through a projection lens according to a third embodiment of the invention for generating light source images of different sizes.

Another embodiment of a projection lens 10 according to the invention is depicted in FIG. 5, wherein the variations in the light entry surface 12 and the light exit surface 13 are not depicted to scale, in order to more clearly illustrate the principle of the invention. A projection lens 10 is depicted in FIG. 5 that generates a combination of strongly diverging and nearly parallel beams. The strongly diverging light beams are used thereby for generating larger light source images in the foreground or the lateral regions of a light distribution. The nearly parallel light beams are used, conversely, for generating relatively smaller light source images in the region of the light/dark border.

The light beams, diverging relatively strongly in comparison with a conventional projection lens 20, basically in the middle of the projection lens 10, are indicated with the reference numeral 18 in FIG. 5. Light beams that are concentrated relatively strongly in comparison with a conventional projection lens 20 at a spacing to the middle of the lens 10 are indicated by the reference numeral 19. Light beams are illustrated at the outer edge of the projection lens 10, the divergence of which basically corresponds to that of a conventional projection lens 20. As can be clearly discerned in FIG. 5, the beam bundles for each light source image have different divergences. The light entry surface 12 and the light exit surface 13 also ensure in this case that each light source image, or the highest point of each light source image, respectively, lies directly on the light/dark border.

Figure 6:
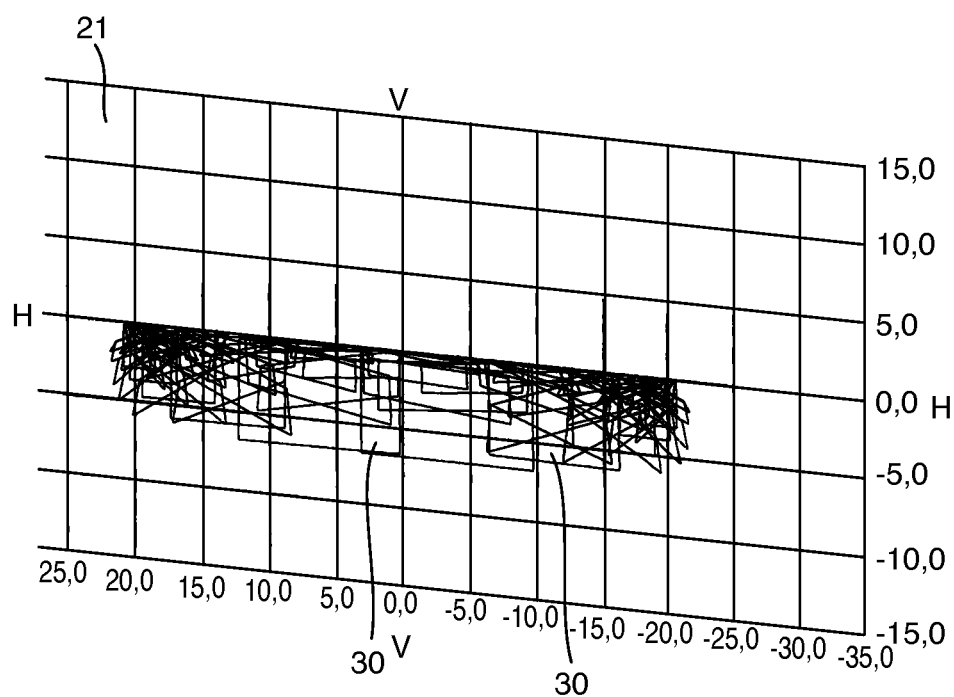
FIG. 6 shows exemplary light source images generated with the lens of FIG. 5.
Figure 7:
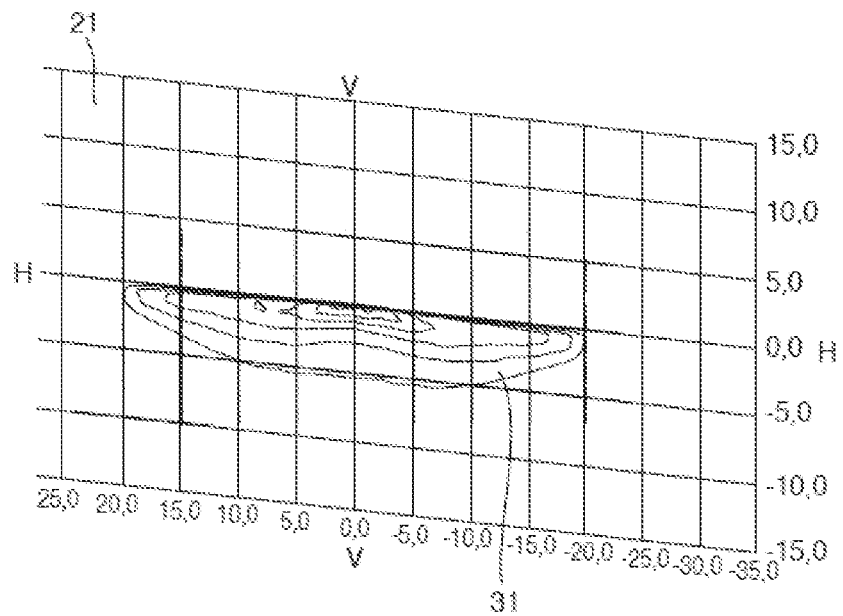
FIG. 7 shows a light distribution obtained with the lens of FIG. 5 by superimposing the light source images of FIG. 6.

Light source images 30 generated with the lens 10 from FIG. 5 are depicted in an exemplary manner in FIG. 6 on a measurement screen 21. The light source images 30 have not only different shapes, but they also have clearly different sizes. The corresponding light distribution 31, which can be generated by superimposing the light source images 30 in FIG. 6, from the projection lens 10 in FIG. 5, is depicted in FIG. 7. As a result of all of the light source images 30, or their highest point, respectively, lying directly beneath the light/dark border, and differ due to their expansion in the vertical direction; on one hand, a sharply light/dark border is generated, and on the other hand, a good foreground illumination is obtained. The focal point of the light remains in the proximity of the light/dark border thereby, as is desired. This results in a clearly better range for the light distribution 31, while still obtaining a clearly better foreground illumination.

Figures 8A, 8B:
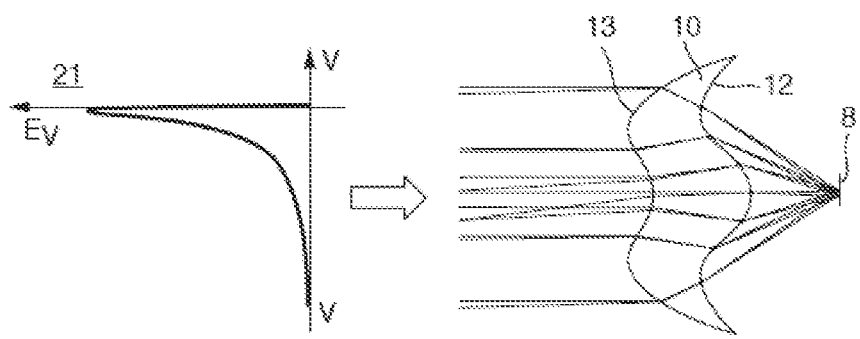
FIG. 8A shows a specification for a light distribution in a vertical direction.
FIG. 8B shows vertical cut through a projection lens of the invention designed for fulfilling the specification of FIG. 8A.

With the present invention, and taking as a basis the described considerations, it is possible to generate a projection lens 10 for generating a predefined light distribution 31. Thus, a vertical course of the light distribution 31 on a measurement screen 31 is predefined, and the corresponding projection lens 10 is generated that images a light source 8 in a corresponding manner, such that the desired light distribution can be generated from light source images 30 of different sizes. The desired illumination E is depicted in relation to a vertical position on the measurement screen 21 in FIG. 8A). One possibility for a projection lens 10 obtained in this manner, for generating the predefined light distribution, is depicted in an exemplary manner in FIG. 8B). Here as well, the shape of the light entry surface 12 and the light exit surface 13 in the region of the local thickening and the local recess is not shown to scale, but instead, it is reproduced in an enlarged scale for purposes of illustration.

There are numerous different possibilities for the design of the light entry surface 12 and the light exit surface 13 of the projection lens 10, for generating a desired light distribution. A further embodiment example of a projection lens 10 according to the invention, which in this case is designed such that it is asymmetrical in relation to the optical axis, wherein the light beams, which are more strongly concentrated after passing through the lens 10 than with a conventional projection lens 20, are indicated by the reference numeral 19 in basically the middle of the projection lens 10. Accordingly, those light beams that have a stronger divergence in comparison with a conventional lens 20 after passing through the lens 10 are indicated by the reference numeral 18. The diverging light beams 18 are disposed at a spacing to the middle of the lens 10, or to the more strongly concentrated light beams 19, respectively.

Figure 9:
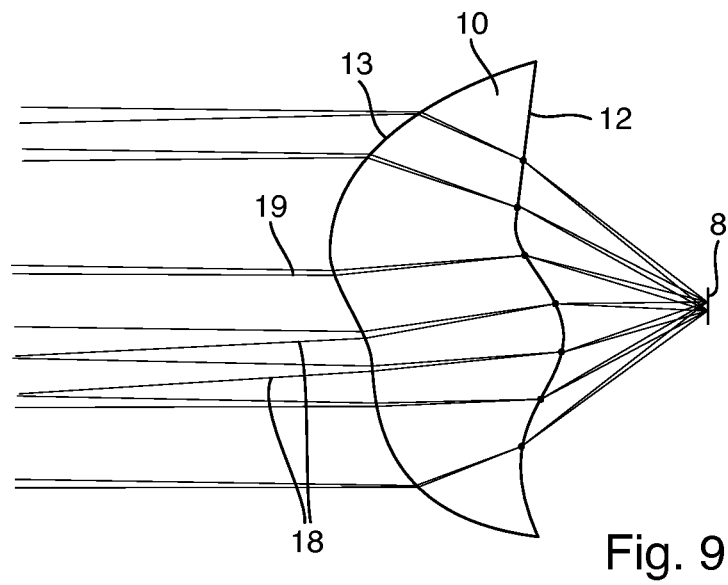
FIG. 9 shows a vertical cut through a projection lens according to a fourth embodiment of the invention.
Figure 10:
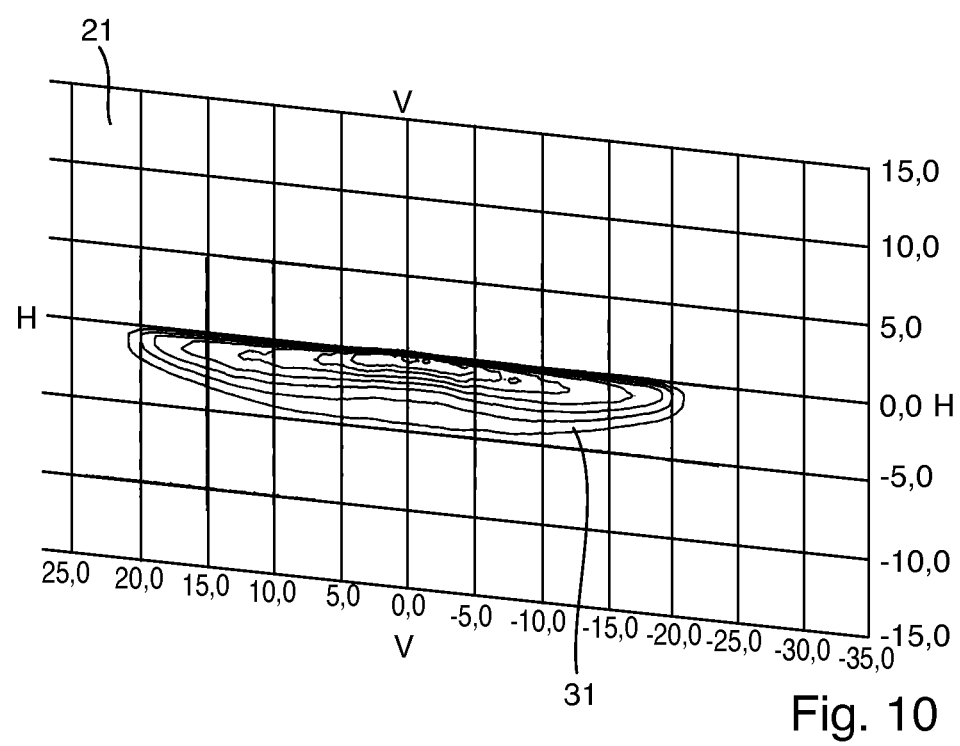
FIG. 10 shows a light distribution obtained with the lens of FIG. 9.

A light distribution 31 obtained with the lens 10 in FIG. 9 is depicted on a measurement screen 21 in FIG. 10. The distinguishing characteristic of all of the embodiments of a projection lens 10 according to the invention that are depicted and described herein is that light source images 30 can be generated locally in the various sub-regions of the light distribution 31, the vertical expansions of which are clearly different, and the highest points of which lie in the close proximity of the light/dark border.

Figure 11:
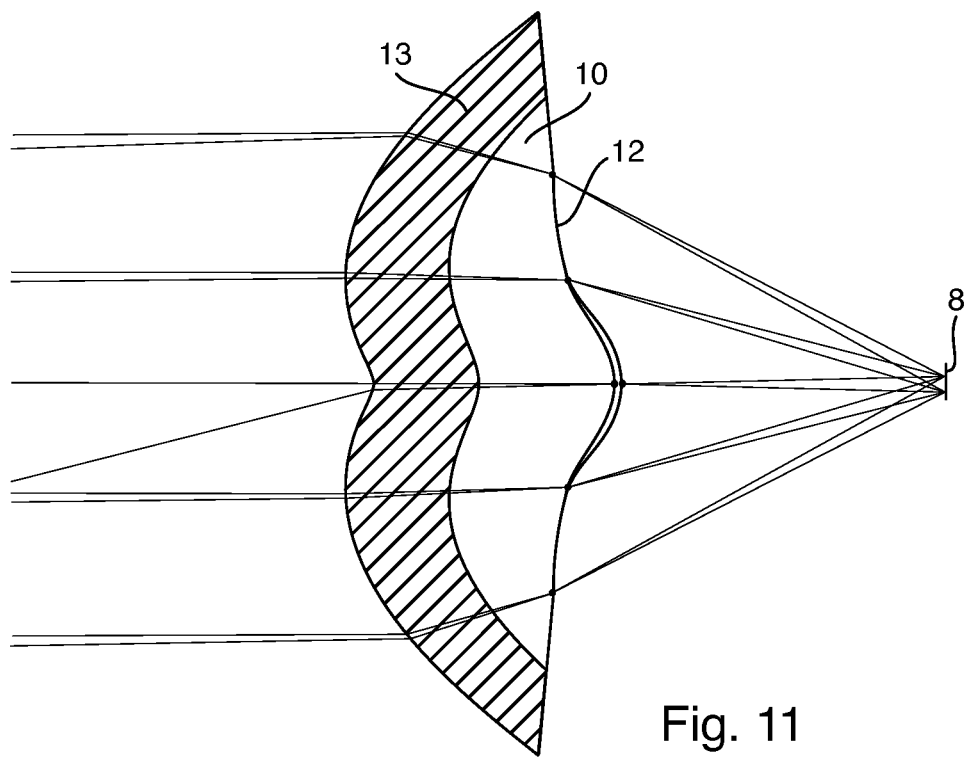
FIG. 11 shows a vertical cut through a projection lens according to a fifth embodiment of the invention, which results in a distortion of a light source in only the vertical direction.
Figure 12:
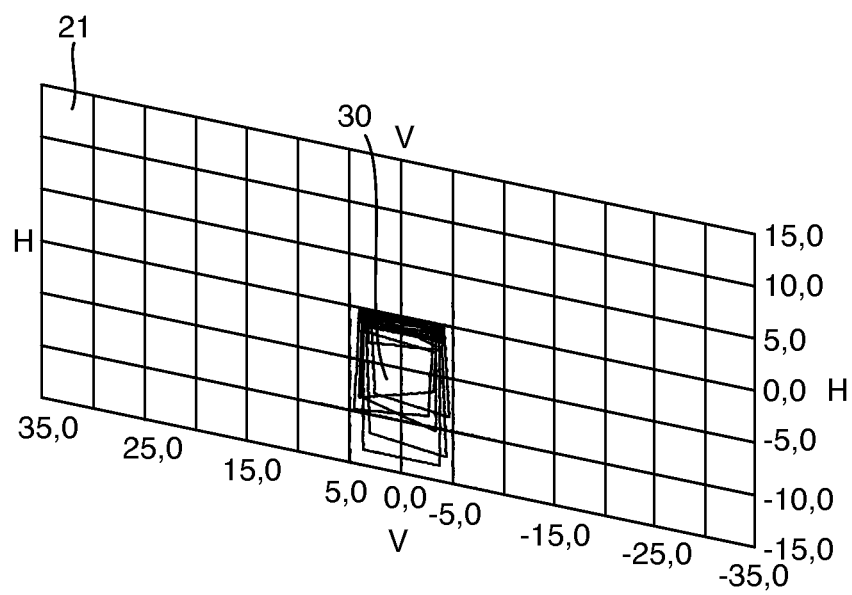
FIG. 12 shows light source images generated by way of example with the lens of FIG. 11, distorted in only the vertical direction.
Figure 13:
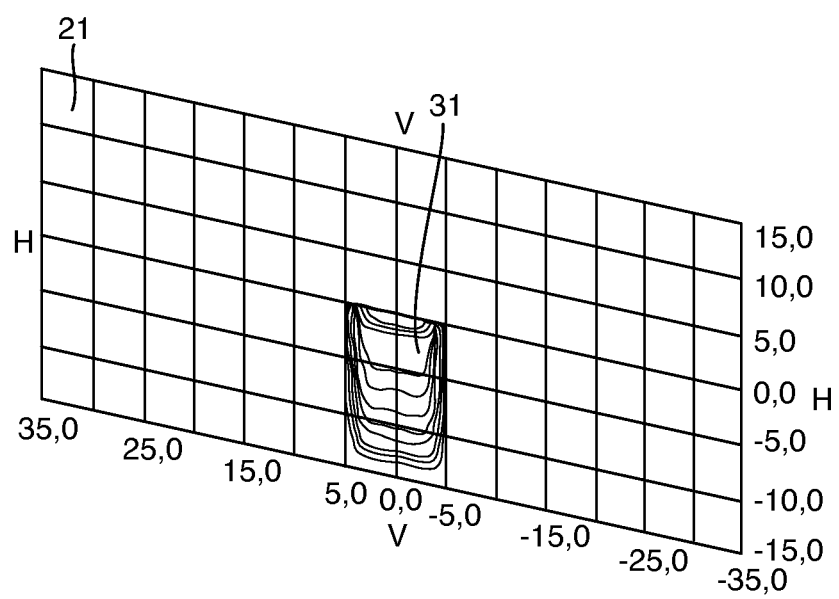
FIG. 13 shows a light distribution obtained with the lens of FIG. 11 by superimposing the light source images of FIG. 12.

So far, only projection lenses have been depicted and described that have a light exit surface 13 that appears to be curved in the vertical direction, and is nearly flat in the horizontal direction. However, it is possible to design surfaces 12, 13 such that curvatures occur in both the vertical as well as horizontal directions of the light exit surface 13. One example of such a projection lens 10 is shown in FIG. 11. In this case, different lens sections are disposed, distributed over the entire lens 10, each of which has a different imaging scale. The entire lens 10 shown in FIG. 11 only distorts the light source 8 in the vertical direction. The light source images 30 generated with the lens 10 from FIG. 11, distorted only in the vertical direction, are depicted on a measurement screen 21 in FIG. 12. The corresponding resulting light distribution 31 on the measurement screen 21, obtained from a superimposing of the images 30 from FIG. 12, is shown in FIG. 13.

Figure 14:
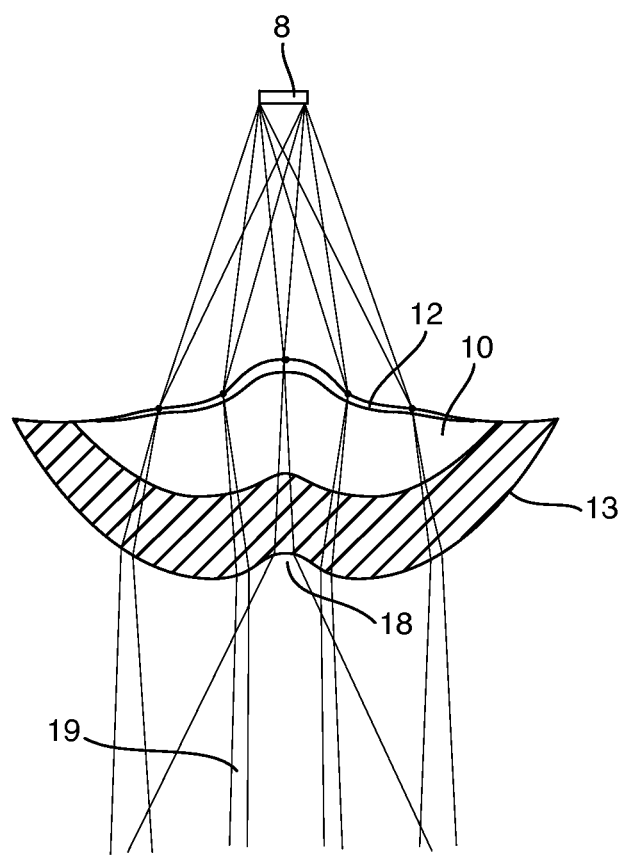
FIG. 14 shows a horizontal cut through a projection lens according to a sixth embodiment of the invention, which results in a distortion of a light source in only the horizontal direction.
Figure 15:
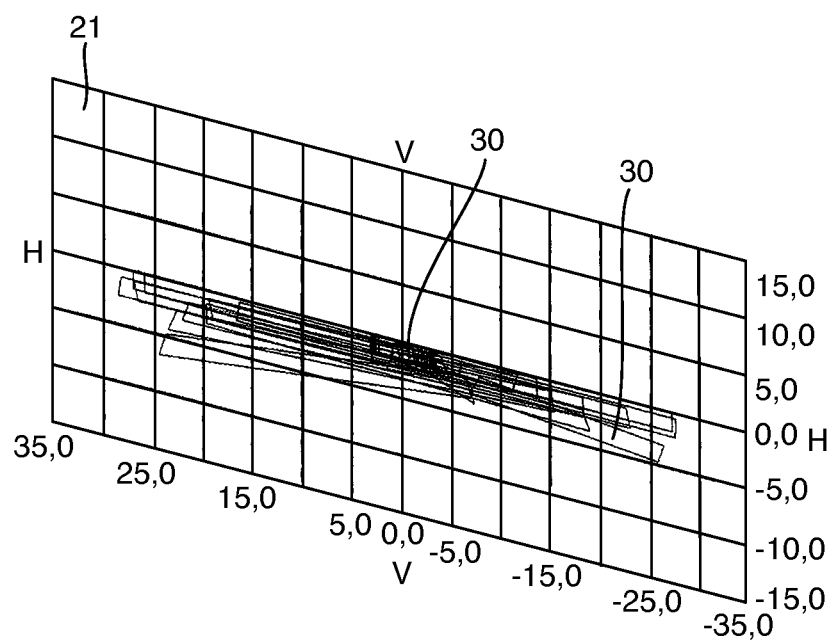
FIG. 15 shows light source images generated with the lens of FIG. 14, distorted in only the horizontal direction.
Figure 16:
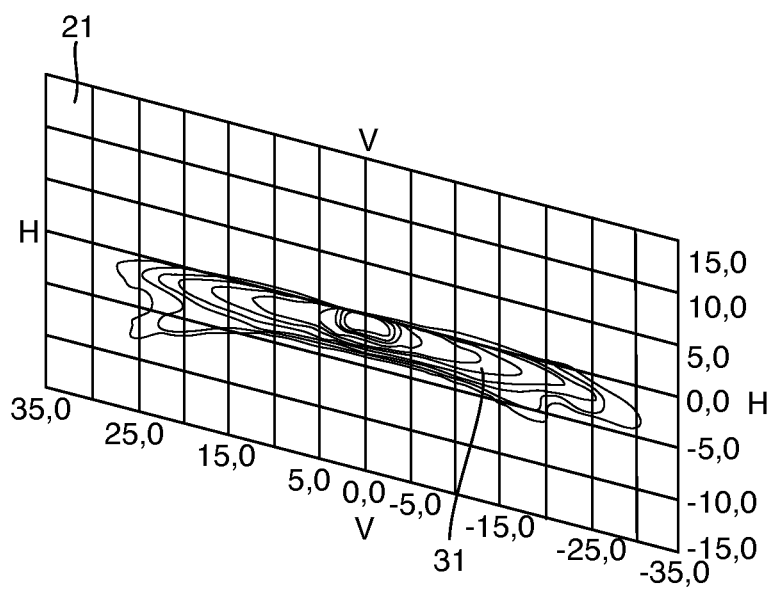
FIG. 16 shows a light distribution obtained with the lens of FIG. 14 by superimposing the light source images of FIG. 15.

An imaging projection lens 10 is depicted in a horizontal cut in FIG. 14, which distorts a light source 8 in only the horizontal direction. Here as well, the strongly diverging light beams are indicated by the reference numeral 18, and the concentrated light beams are indicated by the reference numeral 19. The light source images 31 generated with the lens 10 from FIG. 14, distorted only in the horizontal direction on a measurement screen 21, are shown in an exemplary manner in FIG. 15. The corresponding resulting light distribution 31 on a measurement screen 21 is shown in FIG. 16. In this way, the projection lens 10 from FIG. 14 generates, aside from a light/dark border having high gradients, a horizontal expansion (lateral diffusion) of the light distribution 31 as well. As with the vertical expansion of the light distribution 31 via light source images 30 of different sizes (compare FIG. 12), all of the light source images, or their highest points, lie on the light/dark border with the horizontal distortion in FIG. 15, and contribute to the maximum in the horizontal middle of the light distribution. If light source images for the lateral diffusion were displaced laterally, as is the case with conventional systems, they would not be able to contribute to the middle of the light distribution.

By way of example, an imaging lens 10 is shown in a perspective view in FIG. 17, which distorts a light source 8 in both the vertical as well as horizontal direction. For this, a local recess 14 is formed on the light exit side 13 of the lens 10, basically in the middle. The light source images 30, distorted in both the vertical as well as horizontal directions, which are generated with the lens 10 on a measurement screen 21, are shown in FIG. 18. The corresponding light distribution 31, which is obtained with the lens 10 from FIG. 17 by superimposing the light source images 30 according to FIG. 18, is depicted on a measurement screen 21 in FIG. 19.

Figure 24:
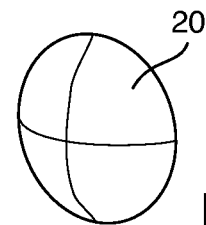
FIG. 24 shows a perspective view of a known projection lens.
Figure 25:
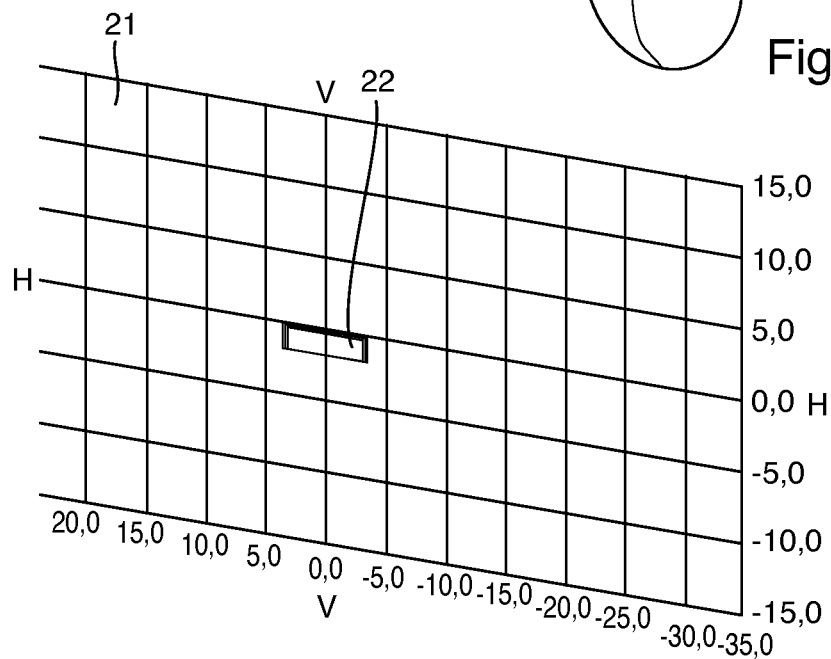
FIG. 25 shows conventional light source images generated with the known lens of FIG. 24.
Figure 26:
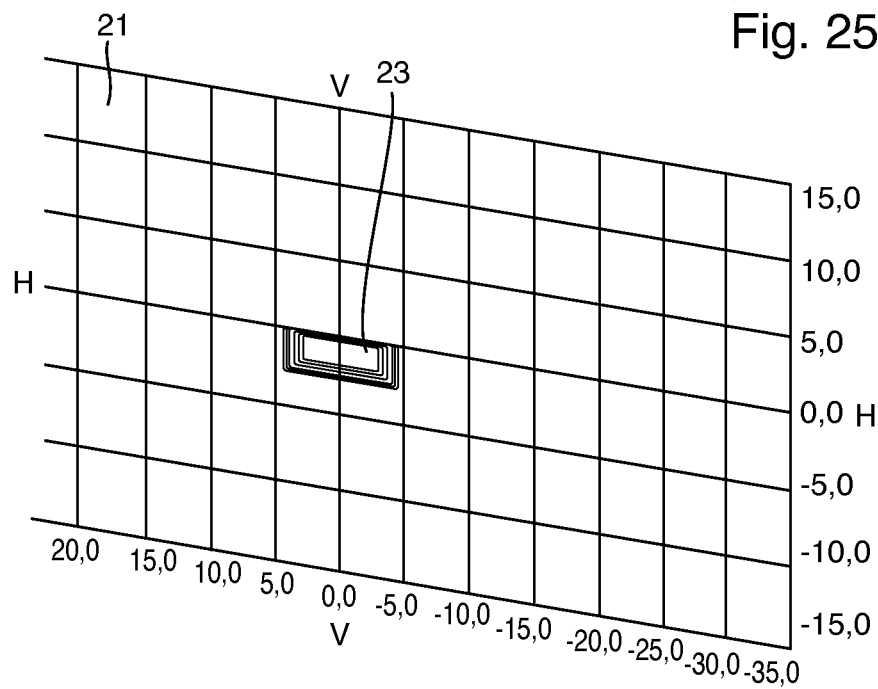
FIG. 26 shows a conventional light distribution obtained with the known lens of FIG. 25 by superimposing the light source images of FIG. 25.

As a comparison to the projection lens 10 according to the invention, from FIG. 17, to the corresponding light source images 30 from FIG. 18, and to the corresponding, resulting light distribution 31 from FIG. 19, the conventional light source images 22 generated with the known lens 20 from FIG. 24 are depicted in FIG. 25, and the conventional light distribution 23 obtained with the known lens 20 from FIG. 24 by superimposing the light source images 22 according to FIG. 25 is depicted in FIG. 26. The different light source images 22 from the conventional lens 20 are all nearly the same size. Accordingly, the resulting, conventional light distribution 23 lacks a strongly pronounced intensity gradient in the region of the light/dark border, as well as a sufficient foreground and lateral illumination. The light distribution 23 has an extension in the vertical direction of only about 0° to −3° (lacking foreground illumination), and an extension in the horizontal direction of about −4° to +4° (lacking lateral illumination).

The possibility of distorting light source images 30 in both the horizontal direction and the vertical direction, meaning to enlarge or to reduce said images, enables the projection lens 10 according to the invention to fulfill, accordingly, the requirements for the desired light distribution 31. Large light source images 30 are used for the foreground and/or lateral diffusion, and small light source images are used for the core of the light distribution in the proximity of the light/dark border.

Figure 20:
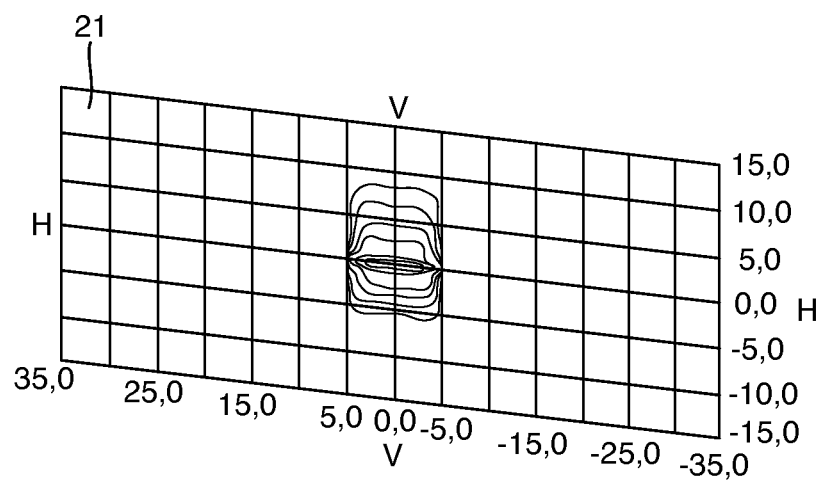
FIG. 20 shows a light distribution that is obtained, starting from the light distribution of FIG. 13, by lowering the light source in relation to the projection lens of FIG. 11.

Because the different sized light source images 30 react differently to the transformations of the light source 8, this behavior can also be used for implementing variable light distributions 31. In this regard, reference is again made to FIG. 13, where a light distribution 31 for a low beam light with a horizontal light/dark border is depicted. The corresponding light distribution for a high beam is shown in FIG. 20, wherein the light source 8 is only moved downward, substantially perpendicular to the optical axis, in relation to the projection lens 20. The light distribution changes very little at the core when switching between the low beam (compare FIG. 13) and high beam (compare FIG. 20). It is raised only slightly toward the horizon, this being entirely desirable. The foreground region, which is generated with large light source images 30, is significantly raised in contrast. This is due, in particular, to the different imaging scales. If all of the light source images 30 had a similar size, they would clearly move in a similar manner with a change in position of the light source 8.

The projection lenses 10 according to the invention, for generating different sized light source images 30, offer the possibility, through the relative movement of the optical elements in relation to one another, of not only displacing the light distribution 31, but also of changing its shape in a fundamental manner. This would be desirable, for example, in switching from a low beam light distribution to a high beam light distribution (so-called bi-functional). In doing so, the light source images 30 would be moved up or down to differing extents with a relative upward or downward movement of the light source 8. This is used to move the core light distribution slightly upward (from just below the light/dark border) (compare FIG. 13) toward the horizon (compare FIG. 20), when switching the light distribution 31 from low beam to high beam, and to move the larger light source images 30 upward (from the near foreground to a region at and above the horizon), which is advantageous with respect to the line of sight for the driver. With a low beam, the main interest of the driver is in the illumination of the foreground, to as far as the light/dark border, while with the high beam, the driver also wants overhead signs or suchlike, lying clearly above the horizon, to be illuminated and discerned.

Further possible designs for the present invention are the following: Instead of a light source 8, a decoupling surface of a light conducting element (optical waveguide, adapter lens, etc.) can also be used; to addition to the light source 8, one or more shading elements (for example, an aperture assembly) can be placed at the focal point of the projection lens 10, which make it possible to increase the gradients of the light distribution in the region of the light/dark border; Instead of a light source 8, a light distribution from another optical system (for example, a reflector, optionally equipped with an aperture assembly) can also be used. The different imaging scales can be used for modifying the light distribution 31, for example, for diffusing the foreground light, or for more strongly concentrating the light locally; Instead of a straight horizontal light/dark border, as a matter of course, light/dark borders can also be generated that are curved, and/or run at a diagonal (for example, a 15% rise with the low beam). Light/dark borders of this type preferably fulfill the requirements of the ECE and/or SAE regulations; Instead of placing all of the light source images 30 directly on the light/dark border, it would also be possible to locally displace some light source images 30 vertically and/or horizontally. A vertical displacement would make sense with conventional reflection systems, in order to be able to better control tolerances in the light source 8 with respect to their position in relation to the projection lens 10, with respect to their design, or similar aspects, such that the tolerances do not result in an unacceptable light distribution 31, because, for example, the intensity values above the light/dark border are too high; Instead of a smooth light exit surface 13 on the lens 10, it would also be possible to provide the lens 10 with local structuring, which soften the light/dark border, meaning that they result in a less sharply focused light/dark border. Further, instead of a light distribution 31 having a light/dark border, the projection lens according to the invention enables generation of a light distribution that does not have a light/dark border (for example, a high beam light distribution). The different sized light source images 30 are also very well suited for generating high beam light distributions. Thus, the characteristic of the light distribution can be varied in a targeted manner. Light source images of the same size would generate a substantially constant, homogenous light distribution. If one has small and large images available, one can use the small images for generating a pronounced "pointed" maximum in a desired region of the light distribution; Instead of a light distribution 31 having a light/dark border, it is also possible to generate a light distribution that has no light/dark border. The different light source images 30 are also well suited for generating light distributions for signal functions (for example, blinkers, navigation light, parking light, tail light, daytime running lights, etc.). It is possible that a lens 10 of this type emits light in a desired direction from all regions of the light exit surface 13, leading to a particularly homogenous appearance from this direction; Instead of moving the light source 8 with the so-called bi-function, it would also be possible to dispose one or more additional light sources at different positions in the light module 7, and to switch these on and/or off in a targeted manner. Thus, the present invention describes projection lenses 10, which can generate different sized light source images 30 with a special design of the light entry surface 12 and/or the light exit surface 13. These light source images 30 can be placed inside the light distribution at nearly any location, depending on the desired objective.

A conventional projection lens 20, as depicted, for example, in FIG. 21, has the disadvantage that foreground and/or lateral regions of the light distribution 23 (compare FIG. 23) are only insufficiently illuminated, because they generate light source images 22 of similar sizes (compare FIG. 22), and all of the light source images 22 are positioned just below the light/dark border. With a projection lens 20 likewise known from the prior art, as depicted, by way of example, in FIG. 1, the light source images of similar sizes are lowered in the middle of the light distribution 23 (compare FIG. 2), basically in the region of the vertical axis VV on the measurement screen, in order to be able to better illuminate the foreground of the light distribution 23. The lowered light source images are lacking, however, for the generation of the light/dark border, which is relatively diffused, and does not have the frequently required sharpness (larger gradient of the light intensity).

With the projection lens 10 according to the invention, the foreground (and/or lateral regions of the light distribution) can be satisfactorily illuminated, and a sharp light/dark border can also be generated. This is enabled in that at least some of the light source images 30 are enlarged with a modification of the imaging scale of the lens 10 in sections, such that, although the larger light source images 30 can still be directed at their uppermost points to close to the light/dark border, they extend in their lower regions, however, so far into the foreground of the light distribution 31 (and/or lateral regions of the light distribution), that they can illuminate the foreground and/or lateral regions well.

Figure 28:
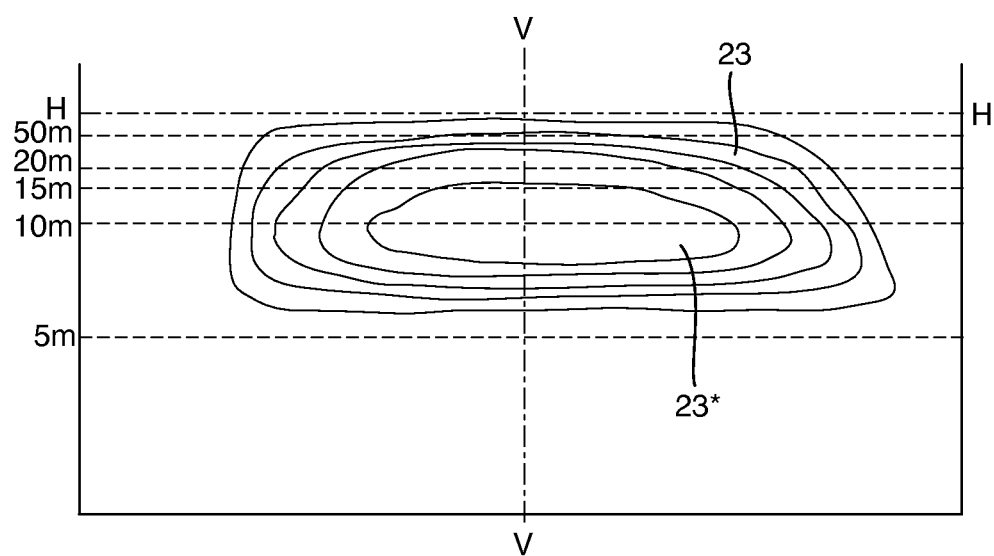
FIG. 28 shows a light distribution that can be obtained with a lens known from the prior art, in accordance with FIG. 21.
Figure 34:
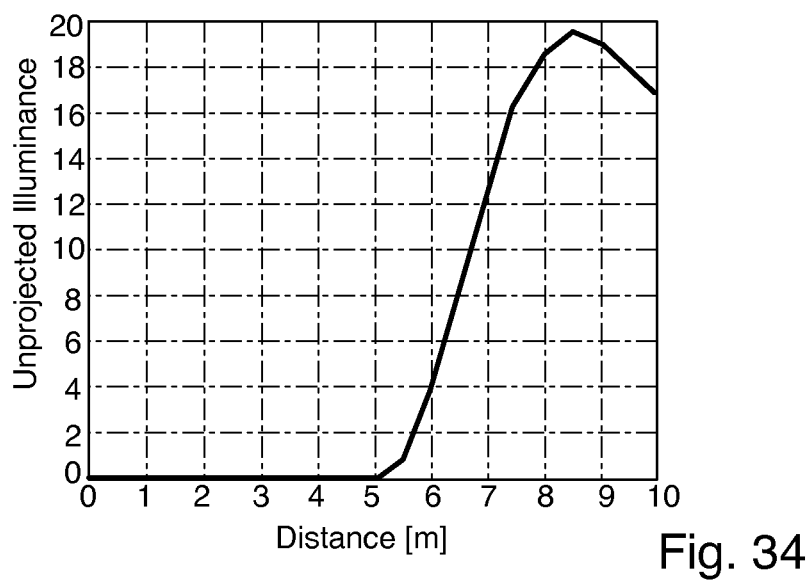
FIG. 34 shows an intensity in the foreground for a light distribution that can be obtained with a lens known from the prior art according to FIG. 21.

In the following, the substantial advantages and features of the projection lens 10 according to the invention are explained again, based on FIGS. 28-30, with a comparison of different light distributions. FIG. 28 shows a light distribution 23 that can be obtained with a lens 20 known from the prior art, in accordance with FIG. 21. This has a very good range, as illustrated by that the focal point of the light 23* lies far in front of the vehicle, i.e. close to the light/dark border. The corresponding intensity distribution for a distance of 20-50 meters in front of the vehicle is depicted in FIG. 31. On the other hand, the light distribution 23 in FIG. 28 provides only a limited foreground illumination, in that the light distribution 23 reaches to the ground at only about 6 meters from the vehicle. The corresponding intensity distribution for a distance of 0-10 meters in front of the vehicle is depicted in FIG. 34.

Figure 29:
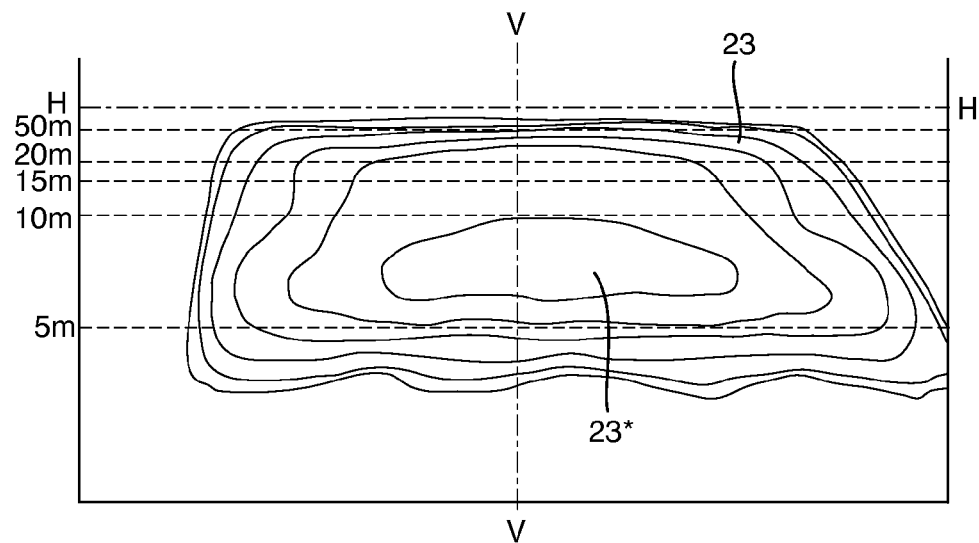
FIG. 29 shows a light distribution that can be obtained with a lens known from the prior art in accordance with FIG. 1.
Figure 32:
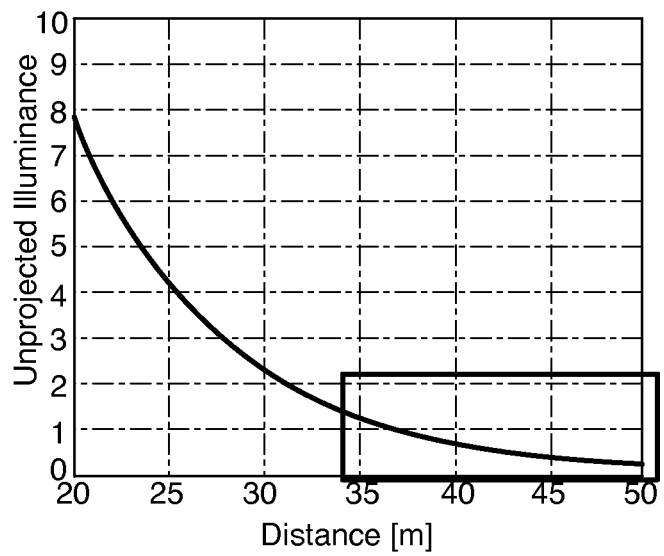
FIG. 32 shows an intensity in the far field region for a light distribution that can be obtained with a lens known from the prior art according to FIG. 1.
Figure 35:
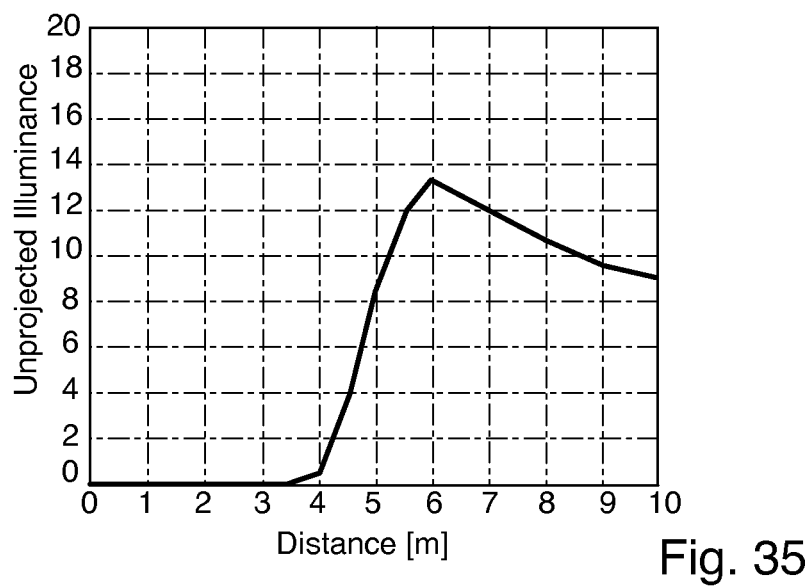
FIG. 35 shows an intensity in the foreground for a light distribution that can be obtained with a lens known from the prior art according to FIG. 1.

FIG. 29 shows a light distribution 23 that can be obtained with a lens 20 known from the prior art in accordance with FIG. 1, in that the focal point 23* of the light lies relatively close in front of the vehicle, i.e. well beneath the light/dark border. The corresponding intensity distribution for a distance of 20-50 meters in front of the vehicle is depicted in FIG. 32. On the other hand, the light distribution 23 from FIG. 29 provides a very good foreground illumination, in that the light distribution 23 reaches to the ground at about 4 meters from the vehicle. The corresponding intensity distribution for a distance of 0-10 meters in front of the vehicle is depicted in FIG. 35.

Figure 30:
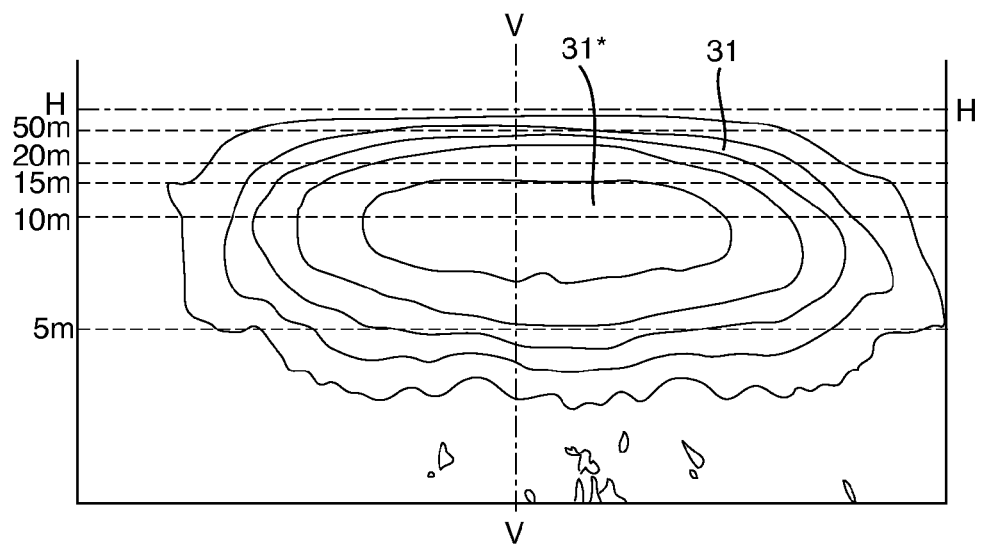
FIG. 30 shows a light distribution that can be obtained with a lens according to the invention.
Figure 31:
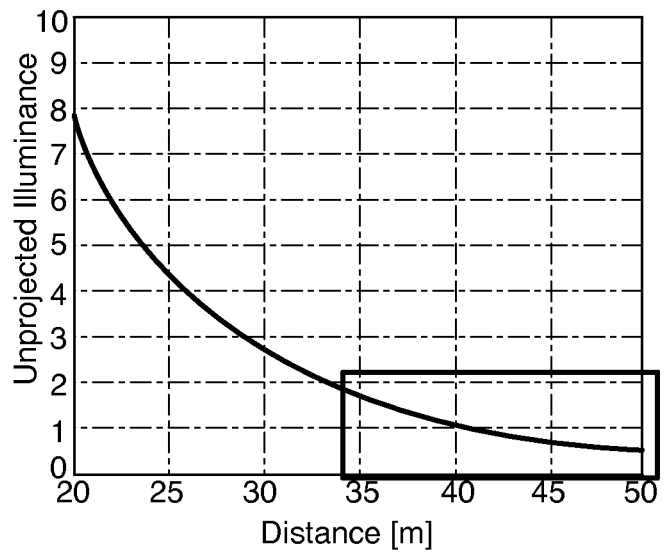
FIG. 31 shows an intensity in the far field region for a light distribution that can be obtained with a lens known from the prior art according to FIG. 21.
Figure 33:
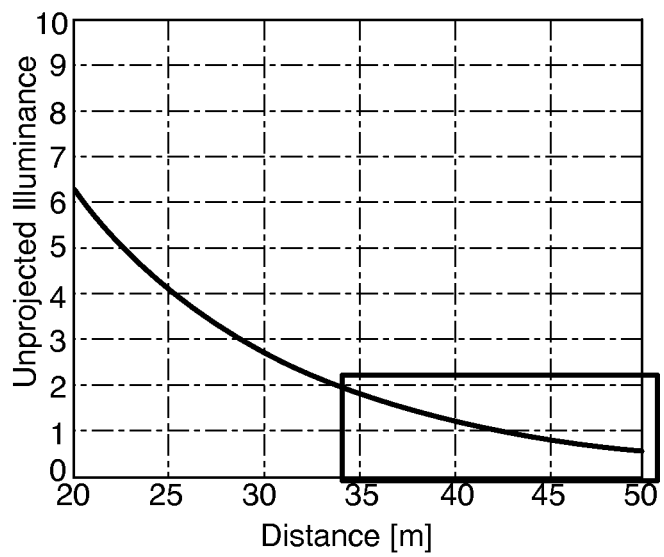
FIG. 33 shows an intensity in the far field region for a light distribution that can be obtained with a lens according to the invention.
Figure 36:
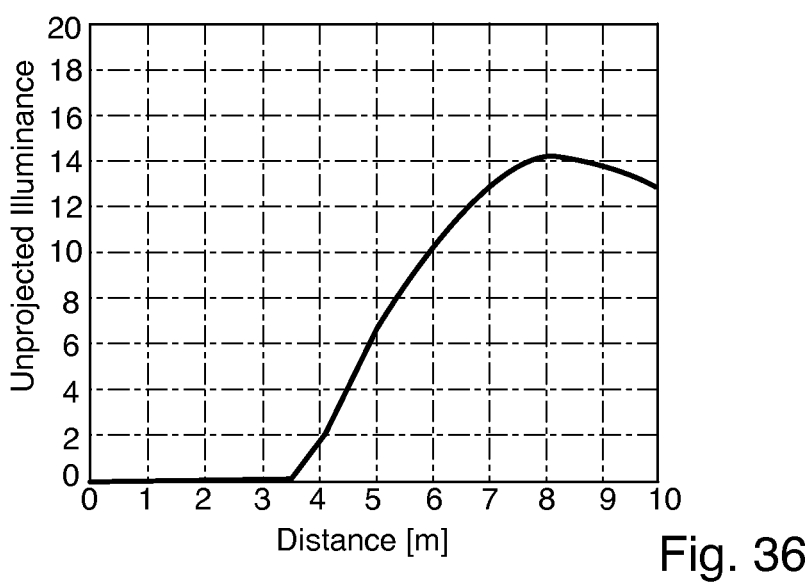
FIG. 36 shows an intensity in the foreground for a light distribution that can be obtained with a lens according to the invention.

FIG. 30 shows a light distribution 31 that can be obtained with a lens 10 according to the invention. This has a very good range, in that the focal point 31* of the light lies far in front of the vehicle, i.e. close to the light/dark border. The corresponding intensity distribution for a distance of 20-50 meters in front of the vehicle is depicted in FIG. 33. Furthermore, the light distribution 31 from FIG. 30 provides a good foreground illumination, in that the light distribution 31 reaches to the ground at less than 4 meters from the vehicle. The corresponding intensity distribution for a distance of 0-10 meters in front of the vehicle is depicted in FIG. 36.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for manufacturing an optical lens for a light module of a motor vehicle, the method including a procedure for calculating surfaces of the lens comprising the steps of:
   a) providing a desired light distribution to be generated by light passing through the calculated lens;
   b) deforming a first surface of the lens so as to generate light source images of different sizes in the light distribution;
   c) deforming a second surface of the lens lying opposite the first surface so as to displace a highest point of the light source images to lie adjacent to a light/dark boundary in a resulting light distribution obtained with the lens having the deformed surfaces;
   d) determining a quality of the resulting light distribution by a comparison with the predefined light distribution;
   e) if the quality lies above a predefined limit value, storing the calculated surfaces for the lens and ending the procedure for calculating surfaces of the lens;
   f) otherwise, renewing deformation of the first surface so as to generate a different bundling of the light source images in the light distribution;
   g) renewing deformation of the second surface so as to displace the highest point of the light source images to lie adjacent to the light/dark border boundary of the resulting light distribution;
   h) repeating steps f) and g) until the quality of the resulting light distribution lies above the limit value; and
   i) storing the calculated surfaces for the lens and ending the procedure for calculating surfaces of the lens; and manufacturing the optical lens with the previously calculated surfaces.

2. The method as set forth in claim 1, wherein the first surface is a light exit surface of the lens through which the light exits the lens, and wherein the second surface is a light entry surface of the lens through which the light enters the lens.

3. The method as set forth in claim 1, wherein an imaging scale, generated with a deformed section of the lens when the first surface has again been deformed, is modified.

4. The method as set forth in claim 1, wherein the quality of the light distribution is determined with an optimization program.

5. The method as set forth in claim 4, wherein the limit value is defined using a given number of optimization cycles.

6. The method as set forth in claim 4, wherein the optimization program uses a target function for describing the light distribution, which is obtained with the lens having the deformed surfaces, wherein the target function is minimized with the deformation of the surfaces.

7. The method as set forth in claim 6, wherein a sum of least squares is used as the target function.

8. The method as set forth in claim 7, wherein the method of least squares is used for minimizing the sum of least squares.

9. The method as set forth in claim 8, wherein intensity values for the predefined light distribution and the light distribution obtained with the lens having the deformed surfaces are compared to one another in identical pixel grids for selected pixels, and the sum of least squares is calculated, respectively, from the square of the difference in intensity values at a specific pixel.

10. A projection lens for a light module for a motor vehicle headlamp, wherein the projection lens is designed for projecting at least a portion of light emitted from a light source in the light module onto a road surface in front of the motor vehicle equipped with the headlamp in order to generate a low beam light distribution, wherein the projection lens is manufactured in accordance with the method of claim 1.

11. A light module or a motor vehicle headlamp including a light source for emitting light, and a projection lens for projecting at least a portion of the light emitted by the light source onto a road surface in front of the motor vehicle equipped with the headlamp in order to generate a low beam light distribution wherein the light module has a projection lens as set forth in claim 10.

12. A motor vehicle headlamp including a light module having a light source for emitting light, and a projection lens for projecting at least a portion of the light emitted by the light source onto a road surface in front of the motor vehicle equipped with the headlamp in order to generate a low beam light distribution wherein the headlamp has a light module as set forth in claim 11.

* * * * *